US012500391B2

(12) United States Patent
Masuda et al.

(10) Patent No.: US 12,500,391 B2
(45) Date of Patent: Dec. 16, 2025

(54) LASER DRIVE APPARATUS, PULSE WIDTH ADJUSTING METHOD, AND SENSING MODULE

(71) Applicant: SONY SEMICONDUCTOR SOLUTIONS CORPORATION, Kanagawa (JP)

(72) Inventors: Takashi Masuda, Kanagawa (JP); Mitsushi Tabata, Kanagawa (JP); Koichi Okamoto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 992 days.

(21) Appl. No.: 17/628,398

(22) PCT Filed: May 24, 2020

(86) PCT No.: PCT/JP2020/020437
§ 371 (c)(1),
(2) Date: Jan. 19, 2022

(87) PCT Pub. No.: WO2021/019880
PCT Pub. Date: Feb. 4, 2021

(65) Prior Publication Data
US 2022/0271502 A1 Aug. 25, 2022

(30) Foreign Application Priority Data
Jul. 31, 2019 (JP) .................................. 2019-140941

(51) Int. Cl.
*H01S 3/10* (2006.01)
*H01S 5/042* (2006.01)
(Continued)

(52) U.S. Cl.
CPC ........ *H01S 5/06233* (2013.01); *H01S 5/0428* (2013.01); *H01S 5/06808* (2013.01);
(Continued)

(58) Field of Classification Search
CPC ............... H01S 5/06233; H01S 5/0428; H01S 5/06808; H01S 5/0239; H01S 5/423
See application file for complete search history.

(56) References Cited

U.S. PATENT DOCUMENTS

2016/0313445 A1* 10/2016 Bailey .................... G01S 17/88
2017/0273161 A1    9/2017 Nakamura
(Continued)

FOREIGN PATENT DOCUMENTS

CN    108028507 A    5/2018
EP     3223034 A1    9/2017
(Continued)

OTHER PUBLICATIONS

International Search Report and Written Opinion of PCT Application No. PCT/JP2020/020437, issued on Aug. 11, 2020, 10 pages of ISRWO.

*Primary Examiner* — Kinam Park
(74) *Attorney, Agent, or Firm* — CHIP LAW GROUP

(57) ABSTRACT

By eliminating the need to use a high-precision clock in pulse width detection for pulse width adjustment in a case where light-emitting elements as vertical-cavity surface-emitting lasers are pulse-driven, circuit configuration is simplified and cost is reduced. A laser drive apparatus according to the present technology includes a drive circuit unit that drives light-emitting elements as vertical-cavity surface-emitting lasers to emit light on the basis of a pulse signal, a pulse width detection unit that detects the pulse width of the pulse signal on the basis of the potential of a capacitor when the capacitor is charged on the basis of the (Continued)

pulse signal, and a control unit that performs control so that the pulse width is adjusted on the basis of a detection result of the pulse width.

13 Claims, 19 Drawing Sheets

(51) Int. Cl.
*H01S 5/062* (2006.01)
*H01S 5/068* (2006.01)
*G01S 7/484* (2006.01)
*G01S 7/486* (2020.01)
*H01S 5/0239* (2021.01)
*H01S 5/42* (2006.01)

(52) U.S. Cl.
CPC ............... *G01S 7/484* (2013.01); *G01S 7/486* (2013.01); *H01S 5/0239* (2021.01); *H01S 5/423* (2013.01)

(56) References Cited

U.S. PATENT DOCUMENTS

| | | | |
|---|---|---|---|
| 2018/0038945 A1* | 2/2018 | Zhuang | G01S 7/497 |
| 2018/0269651 A1 | 9/2018 | Oka et al. | |
| 2019/0025406 A1* | 1/2019 | Krelboim | H01S 5/062 |
| 2021/0296855 A1* | 9/2021 | Huang | G01S 17/36 |

FOREIGN PATENT DOCUMENTS

| | | |
|---|---|---|
| EP | 3335283 A1 | 6/2018 |
| EP | 3376833 A1 | 9/2018 |
| IL | 240571 A | 12/2016 |
| JP | 2000-114669 A | 4/2000 |
| JP | 2000-354370 A | 12/2000 |
| JP | 2012-195436 A | 10/2012 |
| JP | 2015-103727 A | 6/2015 |
| JP | 2017-173298 A | 9/2017 |
| JP | 2018-157695 A | 10/2018 |
| JP | 2019-068528 A | 4/2019 |
| WO | 2017/025958 A1 | 2/2017 |
| WO | 2019/087524 A1 | 5/2019 |

* cited by examiner

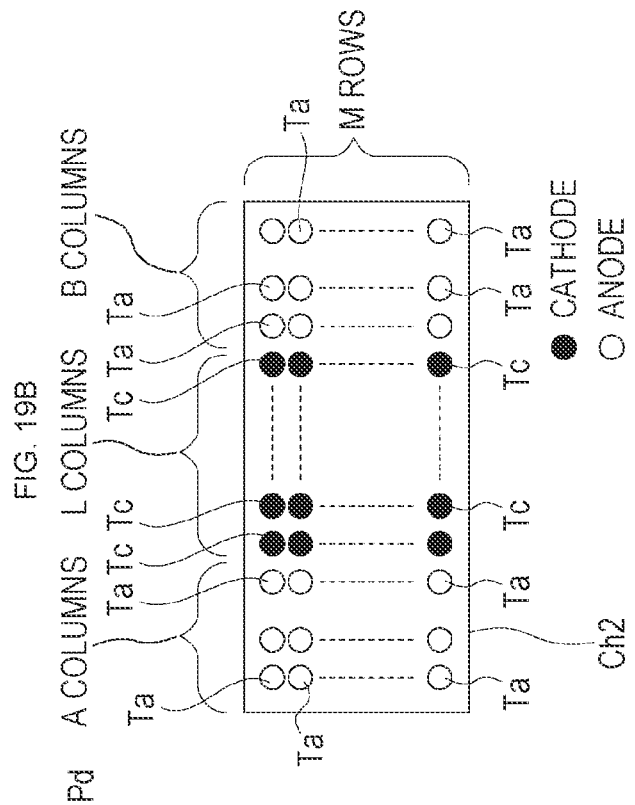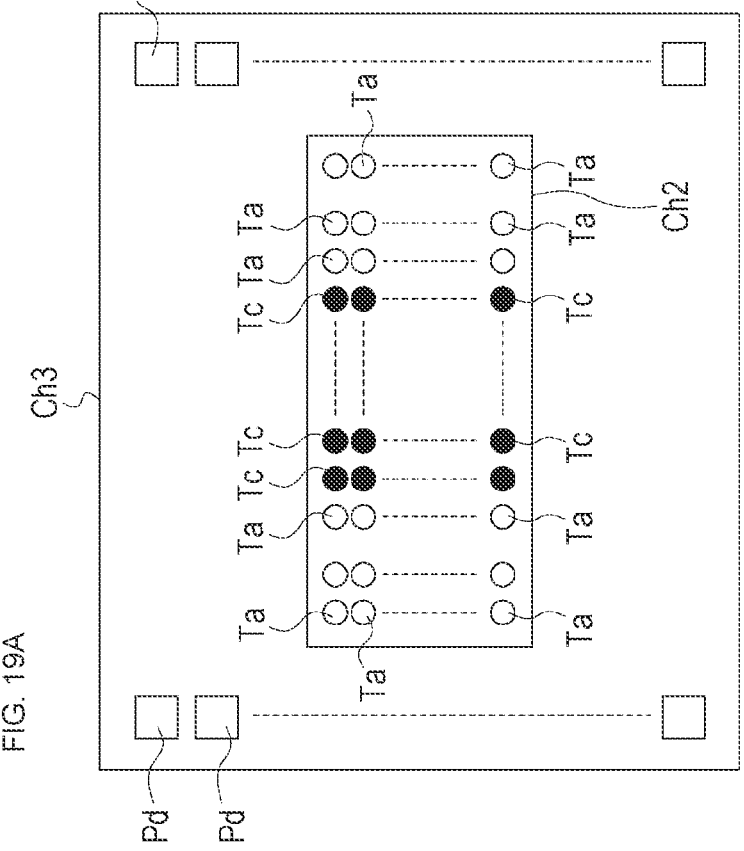

LASER DRIVE APPARATUS, PULSE WIDTH ADJUSTING METHOD, AND SENSING MODULE

CROSS REFERENCE TO RELATED APPLICATIONS

This application is a U.S. National Phase of International Patent Application No. PCT/JP2020/020437 filed on May 24, 2020, which claims priority benefit of Japanese Patent Application No. JP 2019-140941 filed in the Japan Patent Office on Jul. 31, 2019. Each of the above-referenced applications is hereby incorporated herein by reference in its entirety.

TECHNICAL FIELD

The present technology relates to a laser drive apparatus that drives light-emitting elements as vertical-cavity surface-emitting lasers to emit light on the basis of a pulse signal, a pulse width adjusting method of adjusting the pulse width of the pulse signal, and a sensing module including a light-receiving sensor that receives light emitted from the light-emitting elements and reflected by a subject.

BACKGROUND ART

As a light-emitting element that emits laser light, a light-emitting element as a vertical-cavity surface-emitting laser (VCSEL) is known (see, for example, Patent Documents 1 and 2 below).

A light-emitting element as a VCSEL includes a resonator formed in a direction perpendicular to the surface of the semiconductor substrate to emit laser light in the perpendicular direction, and has been widely used in recent years as a light source in measuring a distance to a subject by, for example, a structured-light (STL) method or a time-of-flight (ToF) method.

CITATION LIST

Patent Document

Patent Document 1: Japanese Patent Application Laid-Open No. 2012-195436
Patent Document 2: Japanese Patent Application Laid-Open No. 2015-103727

SUMMARY OF THE INVENTION

Problems to be Solved by the Invention

Here, in a case where a ToF method is adopted as a distance measurement method, particularly, in a case where a direct ToF method is adopted, the pulse width when the light-emitting elements are pulsed to emit light is small, and it is regarded as a technical problem to cause the light-emitting elements to emit light using an accurate pulse width. For this, it is considered to detect the pulse width to adjust the pulse width on the basis of the detection result.

However, the pulse width in a direct ToF method is extremely small, 1 ns, for example, and a high pulse width accuracy of, for example, about 10 ps is required. Thus, a clock used in pulse width detection needs to have a detection capability of about 100 GHz.

Consequently, configuration related to pulse width detection contributes to an increase in circuit scale and an increase in cost.

The present technology has been made in view of the above circumstances, and an object thereof is to simplify circuit configuration and reduce cost by eliminating the need to use a high-precision clock in pulse width detection for pulse width adjustment in a case where light-emitting elements as vertical-cavity surface-emitting lasers are pulse-driven.

Solutions to Problems

A laser drive apparatus according to the present technology includes a drive circuit unit that drives light-emitting elements as vertical-cavity surface-emitting lasers to emit light on the basis of a pulse signal, a pulse width detection unit that detects the pulse width of the pulse signal on the basis of the potential of a capacitor when the capacitor is charged on the basis of the pulse signal, and a control unit that performs control so that the pulse width is adjusted on the basis of a detection result of the pulse width.

This eliminates the need to use a high-speed clock for pulse width detection even if the pulse width to be detected is small.

In the laser drive apparatus according to the present technology described above, the pulse width detection unit may start and stop charging of the capacitor according to the pulse signal.

This allows the pulse width to be represented by the potential of the capacitor.

In the laser drive apparatus according to the present technology described above, the control unit may cause the pulse width detection unit to measure, as a reference potential, the potential of the capacitor when the capacitor is charged over a predetermined reference period longer than a period corresponding to the pulse width to be adjusted, and cause the pulse width detection unit to measure, as an actual measured potential, the potential of the capacitor when the capacitor is charged on the basis of the pulse signal with the pulse width to be adjusted, and perform adjustment control of the pulse width on the basis of the actual measured potential and the reference potential.

By using the reference potential corresponding to the reference period as described above, a target potential as a potential corresponding to a target pulse width can be estimated from the ratio between a pulse width corresponding to the reference period and the target pulse width. Then, the pulse width can be adjusted on the basis of the error between the estimated target potential and the actual measured potential.

In the laser drive apparatus according to the present technology described above, the control unit may obtain, as a target potential, a potential when the capacitor is charged on the basis of the pulse signal with a target pulse width, on the basis of a ratio between the target pulse width and a pulse width corresponding to the reference period, and the reference potential, and perform adjustment control of the pulse width on the basis of the target potential and the actual measured potential.

For the pulse width adjustment control, it is conceivable that a target potential may be stored in advance as a common value in each device without measuring a reference potential as described above, and pulse width adjustment may be performed on the basis of the error between an actual measured potential and the target potential. However, it is conceivable that the relationship between the pulse width and the charging potential of the capacitor may vary between devices due to variations in the characteristics of used components etc. By adopting the method of obtaining the target potential on the basis of the reference potential as described above, such variations between devices can be absorbed.

In the laser drive apparatus according to the present technology described above, the control unit may cause the potential of the capacitor when the capacitor is charged over a period of one cycle of the pulse signal to be measured as the reference potential.

This eliminates the need to increase the pulse width to the pulse width for reference potential measurement to measure the reference potential.

In the laser drive apparatus according to the present technology described above, the laser drive apparatus may include a plurality of the drive circuit units, each of which drives a different one of the light-emitting elements to emit light, and the pulse width detection unit may detect the pulse width on the basis of the pulse signal before branching off to the plurality of drive circuit units.

This eliminates the need to provide the pulse width adjusting unit for each drive circuit unit in a case where a configuration in which each of the plurality of drive circuit units drives a different one of the light-emitting elements to emit light is adopted.

In the laser drive apparatus according to the present technology described above, the pulse width detection unit may detect the pulse width on the basis of the pulse signal before branching off input through a replica circuit simulating characteristics of the drive circuit units and subsequent circuit portions.

This allows the detection of the pulse width based on the pulse signal to which a delay expected to occur in the drive circuit units and the subsequent circuit portions has been applied.

The laser drive apparatus according to the present technology described above may further include a pulse width adjusting unit that adjusts the pulse width on the basis of control by the control unit.

This allows the detection of the pulse width to the adjustment of the pulse width to be completed in the same chip.

Furthermore, a pulse width adjusting method according to the present technology is a pulse width adjusting method in a laser drive apparatus that drives light-emitting elements as vertical-cavity surface-emitting lasers to emit light on the basis of a pulse signal, and is a pulse width adjusting method including detecting the pulse width of the pulse signal on the basis of the potential of a capacitor when the capacitor is charged on the basis of the pulse signal, and adjusting the pulse width on the basis of a detection result of the pulse width.

This pulse width adjusting method also provides effects similar to those of the laser drive apparatus according to the present technology described above.

Furthermore, a sensing module according to the present technology includes a light-emitting portion in which a plurality of light-emitting elements as vertical-cavity surface-emitting lasers is arranged, a laser drive apparatus including a drive circuit unit that drives the light-emitting elements to emit light on the basis of a pulse signal, a pulse width detection unit that detects the pulse width of the pulse signal on the basis of the potential of a capacitor when the capacitor is charged on the basis of the pulse signal, and a control unit that performs control so that the pulse width is adjusted on the basis of a detection result of the pulse width, and a light-receiving sensor that receives light emitted from the light-emitting portion and reflected by a subject.

This sensing module also provides effects similar to those of the laser drive apparatus according to the present technology described above.

In the sensing module according the present technology described above, the light-receiving sensor may be a sensor for distance measurement using a direct ToF method including SPAD elements as light-receiving elements that receive light reflected by the subject.

In direct ToF, the pulse width of a laser drive signal tends to be small.

In the sensing module according to the present technology described above, the light-receiving sensor may include a pulse width adjusting unit that adjusts the pulse width on the basis of control of the control unit in the laser drive apparatus.

The light-receiving sensor for distance measurement using the direct ToF method includes a high-precision clock. Thus, the provision of the pulse width adjusting unit in the light-receiving sensor as described above eliminates the need to additionally provide a high-precision clock for pulse width adjustment on the laser drive apparatus side.

In the sensing module according to the present technology described above, the sensing module may include a plurality of the drive circuit units, each of which drives a different one of the light-emitting elements to emit light, a first semiconductor chip on which the plurality of light-emitting elements is formed may be mounted on a second semiconductor chip on which the plurality of drive circuit units is formed, and the positions of a forming region of the plurality of drive circuit units and a forming region of the plurality of light-emitting elements in a chip in-plane direction may overlap each other.

This allows the drive circuit units to be disposed close to the light-emitting elements.

BRIEF DESCRIPTION OF DRAWINGS

FIGS. 19A and 19B are diagrams for explaining an example of terminal arrangement on a semiconductor chip as the light-emitting portion.

MODE FOR CARRYING OUT THE INVENTION

Hereinafter, embodiments according to the present technology will be described in the following order with reference to the accompanying drawings.
<1. Configuration of distance-measuring apparatus>
<2. About circuit configuration related to light emission drive>
<3. Pulse width adjusting method as embodiment>
<4. Processing procedure>
<5. Modification related to reference value acquisition>
<6. Configuration variations>
  [6-1. Configuration example of connection mode of light-emitting elements]
  [6-2. About signal to be detected]
  [6-3. Other configuration examples]
<7. Summary of embodiments>
<8. The present technology>
<1. Configuration of Distance-Measuring Apparatus>

Figure 1:
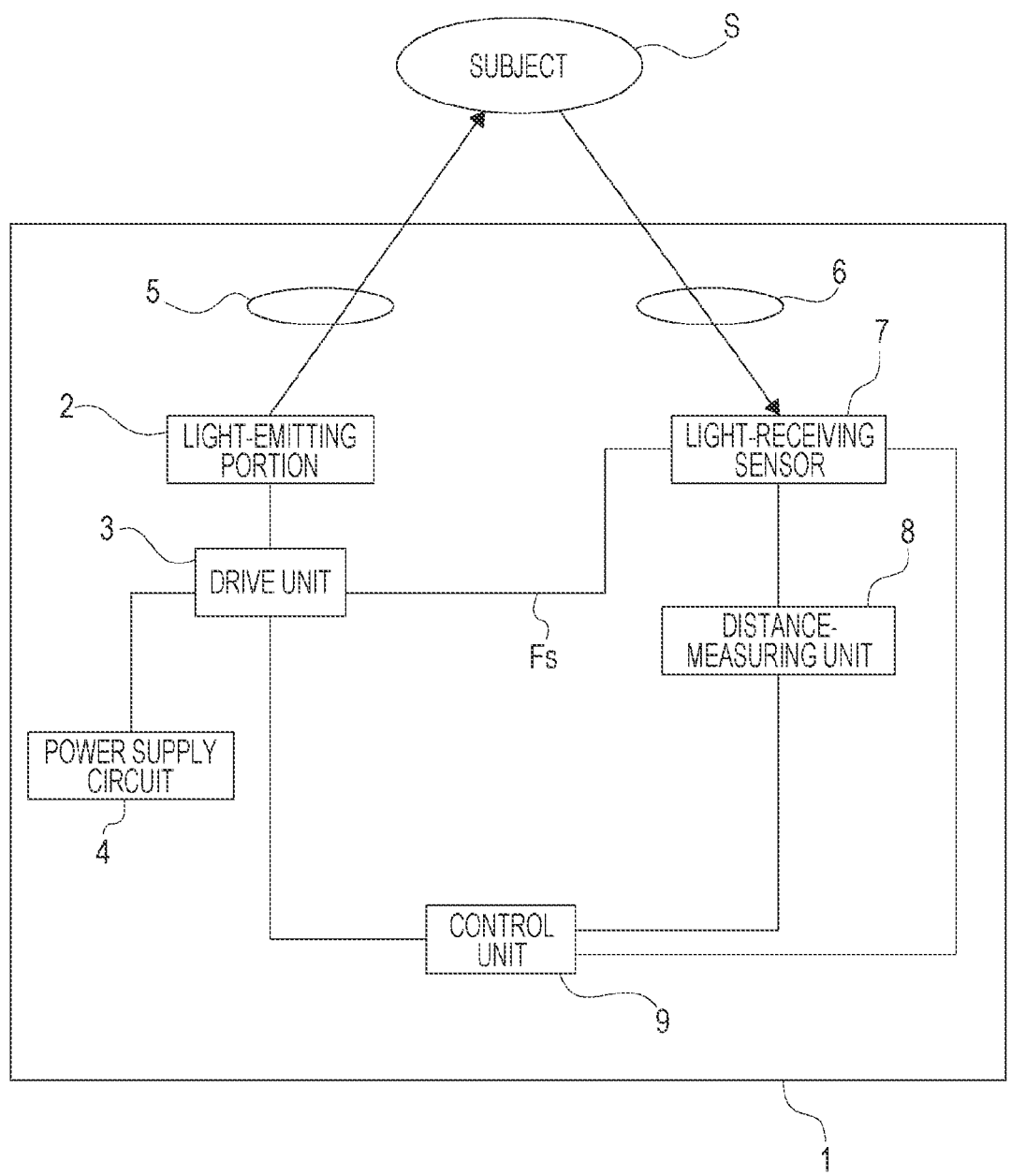
FIG. 1 is a diagram illustrating a configuration example of a distance-measuring apparatus including a laser drive apparatus as an embodiment according to the present technology.

FIG. 1 illustrates a configuration example of a distance-measuring apparatus 1 including a laser drive apparatus as an embodiment according to the present technology.

As illustrated in the figure, the distance-measuring apparatus 1 includes a light-emitting portion 2, a drive unit 3, a power circuit 4, a light-emitting-side optical system 5, a light-receiving-side optical system 6, a light-receiving sensor 7, a distance-measuring unit 8, and a control unit 9.

The light-emitting portion 2 emits light using a plurality of light sources. As will be described later, the light-emitting portion 2 in this example includes light-emitting elements 2a that are vertical-cavity surface-emitting lasers (VCSELs) as the respective light sources. The light-emitting elements 2a are two-dimensionally arranged in a predetermined form such as in a matrix.

The drive unit 3 includes an electric circuit for driving the light-emitting portion 2.

The power circuit 4 generates a power supply voltage of the drive unit 3 on the basis of an input voltage from, for example, a battery or the like (not illustrated) provided in the distance-measuring apparatus 1. The drive unit 3 drives the light-emitting portion 2 on the basis of the power supply voltage.

Light emitted from the light-emitting portion 2 is applied to a subject S as a distance measurement target through the light-emitting-side optical system 5. Then, the light applied in this manner is reflected from the subject S and enters the light-receiving surface of the light-receiving sensor 7 through the light-receiving-side optical system 6.

The light-receiving sensor 7 includes a plurality of light-receiving elements arranged two-dimensionally in a predetermined form such as in a matrix, and receives the reflected light from the subject S entering through the light-receiving-side optical system 6 as described above at each light-receiving element (that is, at each pixel), and converts it into an electrical signal for output. In the distance-measuring apparatus 1 of this example, a time-of-flight (ToF) method, specifically, a direct ToF method is adopted as a distance-measuring method, and a single-photon avalanche diode (SPAD) element is used as each light-receiving element in the light-receiving sensor 7.

The light-receiving sensor 7 in this example outputs a synchronization signal Fs to the drive unit 3. The synchronization signal Fs is a signal indicating a light-receiving period in the light-receiving sensor 7. On the basis of the synchronization signal Fs, the drive unit 3 can cause the light-emitting elements 2a in the light-emitting portion 2 to emit light with timing corresponding to the light-receiving period of the light-receiving sensor 7.

The distance-measuring unit 8 performs distance measurement using the direct ToF method on the basis of light reception signals of the respective pixels input from the light-receiving sensor 7. Specifically, on light that is emitted from the light-emitting portion 2, reflected by the subject S, and received by the light-receiving sensor 7, a distance to the subject S is calculated on the basis of the time difference between the light emission and the light reception and the speed of light.

The control unit 9 includes, for example, a microcomputer including a central processing unit (CPU), read-only memory (ROM), random-access memory (RAM), etc., or an information processing apparatus such as a digital signal processor (DSP), and performs control of the drive unit 3 for controlling light-emitting operation performed by the light-emitting portion 2 and control related to light-receiving operation performed by the light-receiving sensor 7.

Although not illustrated in the figure, in the present embodiment, of the components constituting the distance-measuring apparatus 1, at least the light-emitting portion 2, the drive unit 3, and the light-receiving sensor 7 are formed on the same substrate. That is, a hardware module with the light-emitting portion 2, the drive unit 3, and the light-receiving sensor 7 formed on the same substrate functions as a sensing module that performs light emission to light reception for distance measurement.

<2. About Circuit Configuration Related to Light Emission Drive>

Figure 2:
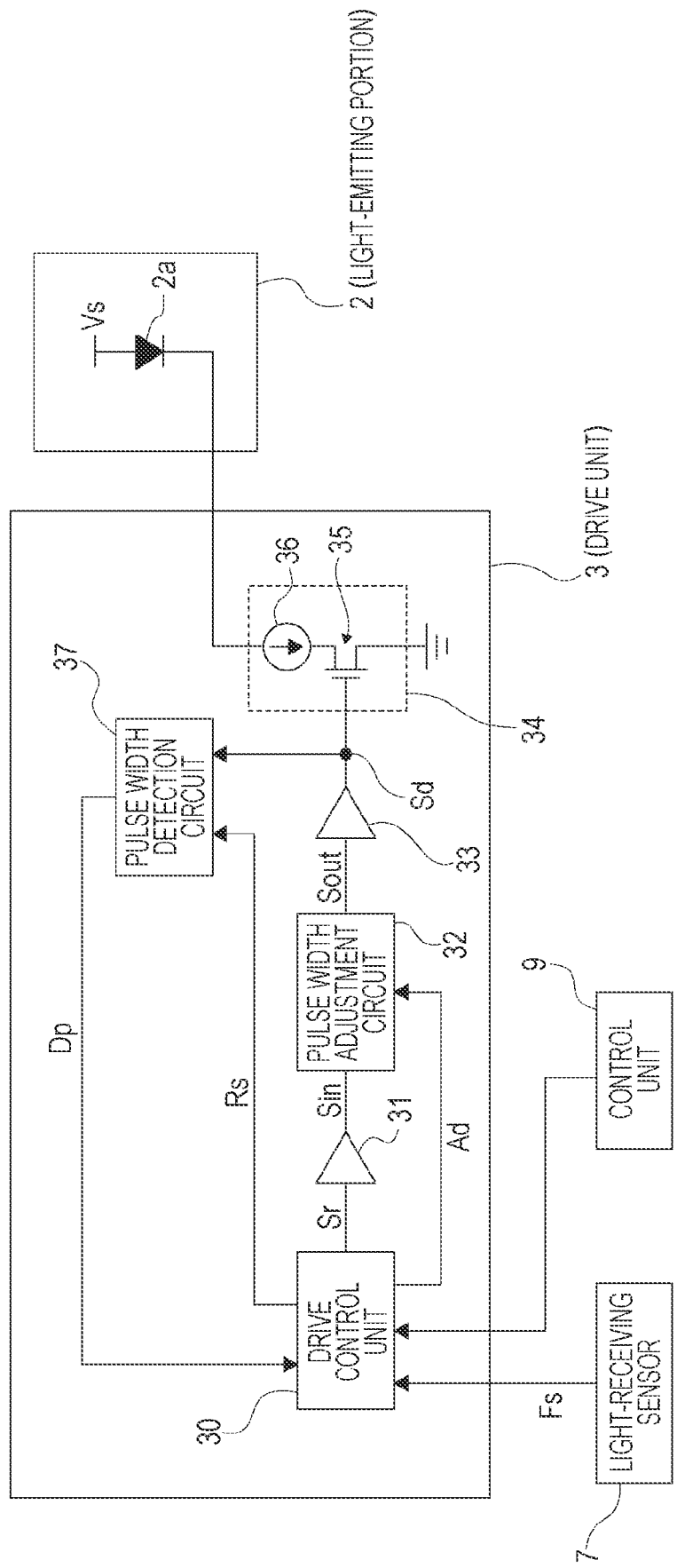
FIG. 2 is a diagram for explaining an internal configuration example of a light-emitting portion and a light-receiving unit illustrated in FIG. 1.

FIG. 2 is a diagram for explaining an internal configuration example of the light-emitting portion 2 and the drive unit 3 illustrated in FIG. 1. Note that FIG. 2 illustrates the light-receiving sensor 7 and the control unit 9 illustrated in FIG. 1 together with the light-emitting portion 2 and the drive unit 3.

As described above, the light-emitting portion 2 includes the plurality of light-emitting elements 2a as VCSELs. FIG. 2 illustrates only one light-emitting element 2a for convenience of illustration. The anodes of the light-emitting elements 2a as VCSELs are connected to a power supply voltage Vs. The cathodes of the light-emitting elements 2a are grounded via a drive circuit 34 described later included in the drive unit 3.

The drive unit 3 includes a drive control unit 30, a buffer 31, a pulse width adjusting circuit 32, a buffer 33, the drive circuit 34, and a pulse width detection circuit 37.

The drive circuit 34 includes a drive element 35 and a current source 36. In this example, a field-effect transistor (FET) is used as the drive element 35, and more specifically, an N-channel metal-oxide-semiconductor (MOS) FET is used. The drive element 35 has the drain connected to the cathodes of the light-emitting elements 2a via the current source 36, and the source grounded.

In the drive circuit 34, a drive signal Sd as a pulse signal is provided to the gate of the drive element 35 via the pulse width adjusting circuit 32 described later. In a period during which the drive signal Sd is OFF, the drive element 35 is in an OFF state, and the light-emitting elements 2a are also in an OFF state (non-light-emitting state). On the other hand, in a period during which the drive signal Sd is ON, the drive element 35 is in an ON state, so that a drive current based on the power supply voltage Vs flows through the light-emitting elements 2a. That is, the light-emitting elements 2a are in an ON state (light-emitting state). At this time, due to the current source 36, the drive current of a constant current value flows through the light-emitting elements 2a.

The drive control unit 30 outputs a reference period signal Sr, controls the pulse width adjusting circuit 32, and controls the pulse width detection circuit 37 on the basis of instructions from the control unit 9.

Here, the reference period signal Sr is a signal that determines the period of the drive signal Sd, and is generated by the drive control unit 30 on the basis of the synchronization signal Fs provided from the light-receiving sensor 7.

The reference period signal Sr output from the drive control unit 30 is input to the pulse width adjusting circuit 32 through the buffer 31. Here, the reference period signal Sr input from the buffer 31 to the pulse width adjusting circuit 32 is referred to as an "input signal Sin".

On the basis of the input signal Sin, the pulse width adjusting circuit 32 generates an output signal Sout having a pulse width depending on an adjustment signal Ad output from the drive control unit 30.

Figure 3:
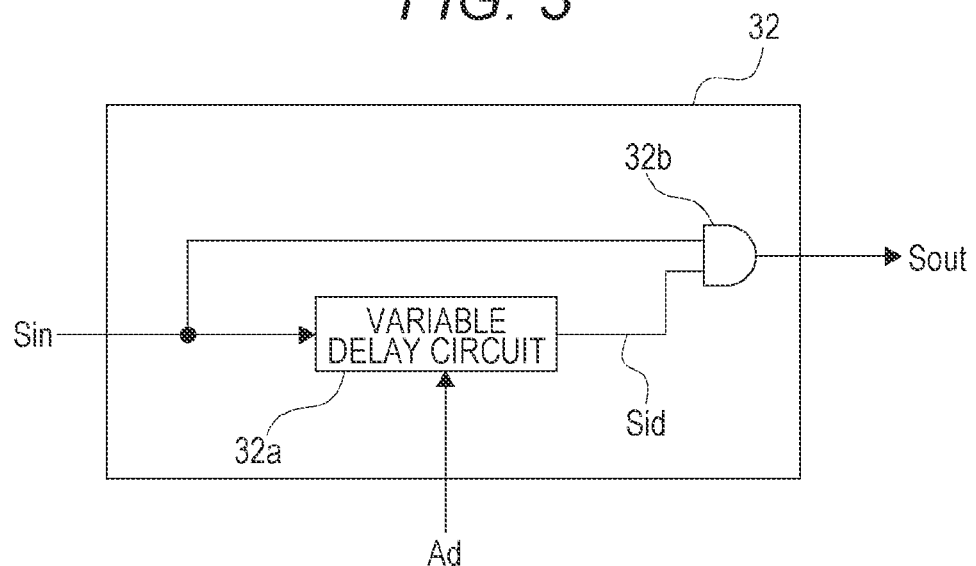
FIG. 3 is a diagram illustrating an internal configuration example of a pulse width adjusting circuit in the embodiment.
Figure 4:
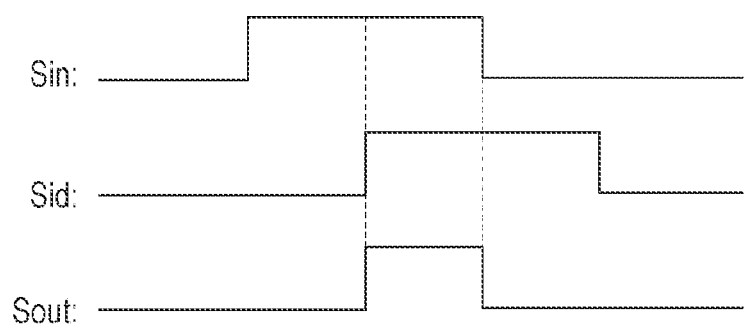
FIG. 4 is a timing chart for explaining the operation of the pulse width adjusting circuit in the embodiment.

FIG. 3 is a diagram illustrating an internal configuration example of the pulse width adjusting circuit 32. FIG. 4 is a timing chart for explaining the operation of the pulse width adjusting circuit 32.

As illustrated in FIG. 3, the pulse width adjusting circuit 32 includes a variable delay circuit 32a and an AND gate circuit 32b. The input signal Sin is input to the variable delay circuit 32a and is also provided to one input terminal of the AND gate circuit 32b. The input signal Sin that has passed through the variable delay circuit 32a is provided as a delayed signal Sid to the other input terminal of the AND gate circuit 32b.

The variable delay circuit 32a delays the input signal Sin by a delay amount depending on the adjustment signal Ad output from the drive control unit 30, and outputs it as the delayed signal Sid.

FIG. 4 illustrates the relationship between the input signal Sin, the delayed signal Sid, and the output signal Sout. It can be seen from FIG. 4 that by changing the delay amount of the input signal Sin in the variable delay circuit 32a, the output signal Sout having a pulse width depending on the delay amount is obtained. For example, by setting the delay amount (delay time) of the input signal Sin shorter than the ON period (the H-level period in this example) of the input signal Sin, the output signal Sout having a pulse width shorter than the ON period can be generated.

In FIG. 2, the output signal Sout from the pulse width adjusting circuit 32 is provided to the drive circuit 34 (provided to the gate of the drive element 35) as the drive signal Sd through the buffer 33.

Furthermore, in this example, the drive signal Sd branches off to be provided to the pulse width detection circuit 37.

The pulse width detection circuit 37 detects the pulse width of the drive signal Sd and outputs a detection value Dp representing the detection result of the pulse width to the drive control unit 30.

Figure 5:
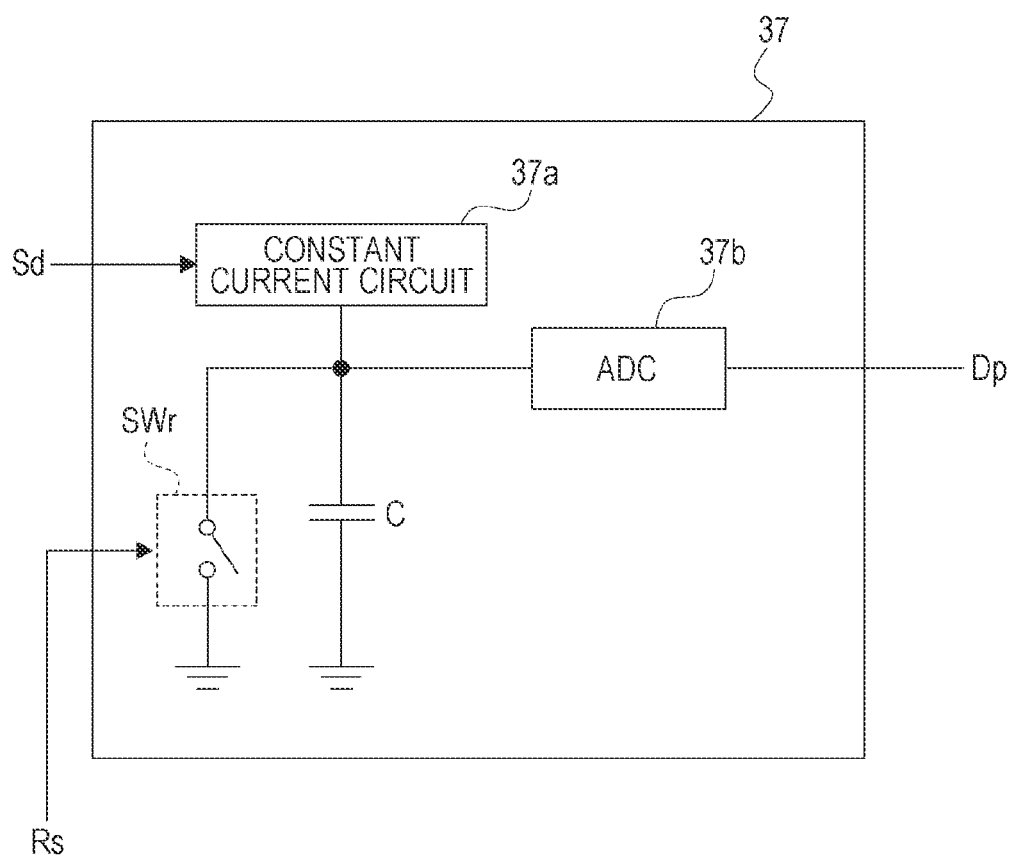
FIG. 5 is a diagram illustrating an internal configuration example of a pulse width detection circuit in the embodiment.

FIG. 5 is a diagram illustrating an internal configuration example of the pulse width detection circuit 37.

As illustrated in the figure, the pulse width detection circuit 37 includes a constant current circuit 37a, a capacitor C, an analog-to-digital converter (ADC) 37b, and a reset switch SWr.

The constant current circuit 37a outputs a current of a constant current value for charging the capacitor C, according to the drive signal Sd. Specifically, the constant current circuit 37a outputs a charging current for the capacitor C during ON periods of the drive signal Sd, and stops outputting the charging current during OFF periods of the drive signal Sd.

As illustrated in the figure, the negative electrode-side terminal of the capacitor C is grounded. Further, the positive electrode-side terminal of the capacitor C is connected to the output terminal (the output terminal for the charging current) of the constant current circuit 37a, and is also connected to the input terminal of the ADC 37b.

The reset switch SWr is inserted between the positive electrode-side terminal of the capacitor C and a ground (GND), and is ON-OFF controlled by a reset signal Rs output from the drive control unit 30. When the reset switch SWr is turned ON, the capacitor C is discharged (that is, a charge is reset).

The ADC 37b detects (measures) the potential of the capacitor C (voltage between both terminals) in digital values, and outputs it as the detection value Dp.

In the pulse width detection circuit 37 of the above configuration, if the pulse width of the drive signal Sd is large, the charging time of the capacitor C is long, and a large value is output as the detection value Dp representing a detection result of the potential of the capacitor C. On the other hand, if the pulse width of the drive signal Sd is small, the charging time of the capacitor C is short, and a small value is output as the detection value Dp.

Thus, the detection value Dp obtained by the pulse width detection circuit 37 functions as a value representing the pulse width of the drive signal Sd.

<3. Pulse Width Adjusting Method as Embodiment>

A pulse width adjusting method as an embodiment will be described with reference to FIGS. 6A and 6B.

First, as a premise, in the pulse width adjusting method of this example, the detection value Dp when the capacitor C is charged by the pulse width detection circuit 37 over a known period as a reference (hereinafter referred to as a "reference period") is acquired as a reference value Vref, and a pulse width is adjusted using the reference value Vref.

The reference period is a period longer than a period corresponding to a pulse width to be adjusted. Here, in this example, the pulse width to be adjusted means the pulse width of the drive signal Sd when the light-emitting portion 2 is driven to emit light for distance measurement. For example, if the period corresponding to the pulse width to be adjusted is about 1 ns as described as an example above, the reference period is set to, for example, 40 ns. The reference period is set to a period sufficiently longer than the period corresponding to the pulse width to be adjusted.

The smaller the pulse width, the worse the reproducibility of the pulse width in the drive signal Sd tends to be. Therefore, by setting the reference period to a period longer than the pulse width to be adjusted as described above, the accuracy of the reference value Vref can be improved, and the accuracy of pulse width adjustment can be improved.

Figure 6A:
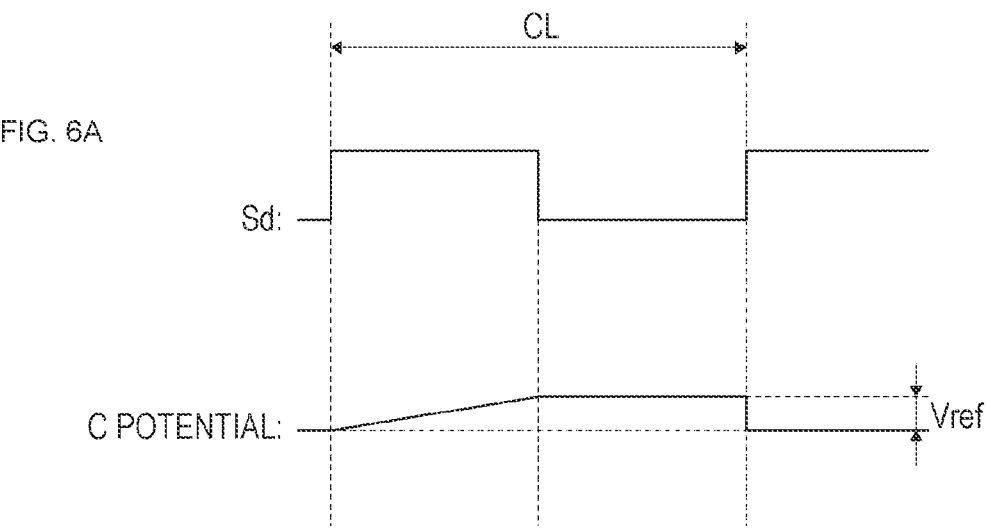
FIGS. 6A and 6B are diagrams for explaining a pulse width adjusting method as an embodiment.

FIG. 6A is an explanatory diagram of operation for acquiring the reference value Vref.

To acquire the reference value Vref, a signal with a known pulse width is input as the drive signal Sd to the pulse width detection circuit 37. The known pulse width mentioned here is a pulse width corresponding to the above-described reference period, and can be rephrased as a predetermined pulse width larger than the pulse width to be adjusted.

In the figure, a period CL corresponding to one cycle of the drive signal Sd is illustrated. The period CL coincides with a period corresponding to one cycle of the reference period signal Sr output from the drive control unit 30.

In this example, the known pulse width is a pulse width corresponding to a half cycle of the drive signal Sd (that is, a pulse width corresponding to CL/2).

To acquire the reference value Vref, the drive control unit 30 controls the pulse width adjusting circuit 32 so that the pulse width of the drive signal Sd is adjusted to the known pulse width as described above.

Then, the drive control unit 30 acquires, as the reference value Vref, the detection value Dp obtained as a pulse width detection result by the pulse width detection circuit 37 on the drive signal Sd adjusted to the known pulse width as described above.

In addition, after acquiring the reference value Vref as described above, the drive control unit 30 acquires the detection value Dp on the pulse width to be adjusted as an actual measured value Vrl.

Figure 6B:
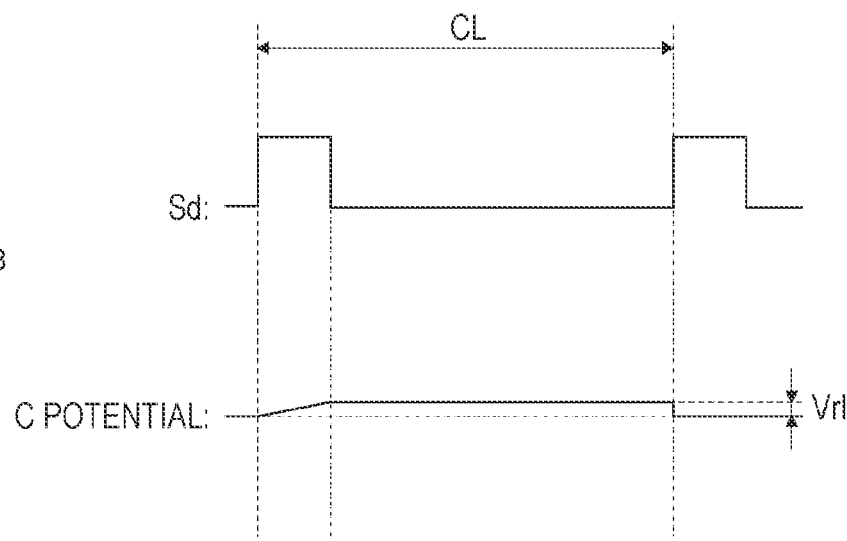

FIG. 6B is an explanatory diagram of operation for acquiring the actual measured value Vrl.

To acquire the actual measured value Vrl, the drive control unit 30 controls the pulse width adjusting circuit 32 so that the pulse width of the drive signal Sd becomes the pulse width when the light-emitting portion 2 is driven to emit light for distance measurement. Then, the drive control unit 30 acquires, as the actual measured value Vrl, the detection value Dp obtained as a pulse width detection result by the pulse width detection circuit 37 on the drive signal Sd adjusted as described above.

Since the reference value Vref is a value corresponding to the known pulse width, it is possible to estimate an error from a pulse width as a target depending on what value the actual measured value Vrl takes with respect to the reference value Vref.

Various methods can be considered as a method of obtaining an error from a pulse width as a target (hereinafter referred to as a "target pulse width") on the basis of the reference value Vref and the actual measured value Vrl. As an example, the following method is adopted in this example.

First, on the basis of the reference value Vref, the potential value of the capacitor C (that is, the detection value Dp) corresponding to the target pulse width is calculated as a target value Vtg. The target value Vtg can be calculated on the basis of the ratio (e.g., percentage) of the target pulse width to the known pulse width set as a reference (the pulse width set when the reference value Vref is obtained), and more specifically, is calculated by multiplying the reference value Vref by the value of the ratio.

Then, the difference between the target value Vtg and the actual measured value Vrl is calculated as a value corresponding to an error from the target pulse width (hereinafter referred to as an "error Dl").

On the basis of the value of the error Dl calculated in this manner, the drive control unit 30 in this example controls the operation of the pulse width adjusting circuit 32 using the adjustment signal Ad, thereby implementing pulse width adjustment to bring the pulse width of the drive signal Sd close to the target pulse width.

<4. Processing Procedure>

With reference to flowcharts in FIGS. 7 and 8, an example of a processing procedure to be executed to implement the pulse width adjusting method as the embodiment described above will be described.

Figure 7:
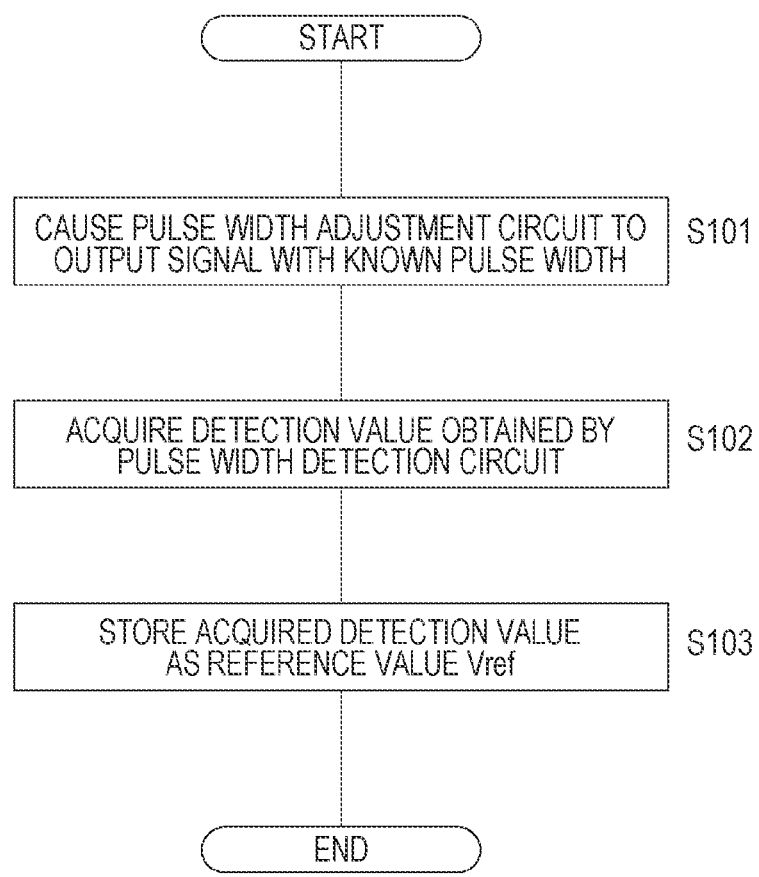
FIG. 7 is a flowchart illustrating an example of a specific processing procedure to be executed by a drive control unit to acquire a reference value.

FIG. 7 illustrates an example of a specific processing procedure to be executed by the drive control unit 30 to acquire the reference value Vref. Note that the processing illustrated in FIG. 7 is executed at a predetermined timing other than at the time of distance measurement (for example, at the time of the start-up of the distance-measuring apparatus 1 or at a timing immediately before the start of distance measurement).

In FIG. 7, in step S101, the drive control unit 30 performs processing to cause the pulse width adjusting circuit 32 to output the signal with the known pulse width. That is, the pulse width adjusting circuit 32 is controlled by the adjustment signal Ad so that the output signal Sout with the pulse width corresponding to the above-described reference period is obtained.

Then, in step S102, the drive control unit 30 acquires the detection value Dp obtained by the pulse width detection circuit 37, and in step S103, stores the acquired detection value Dp as the reference value Vref.

Figure 8:
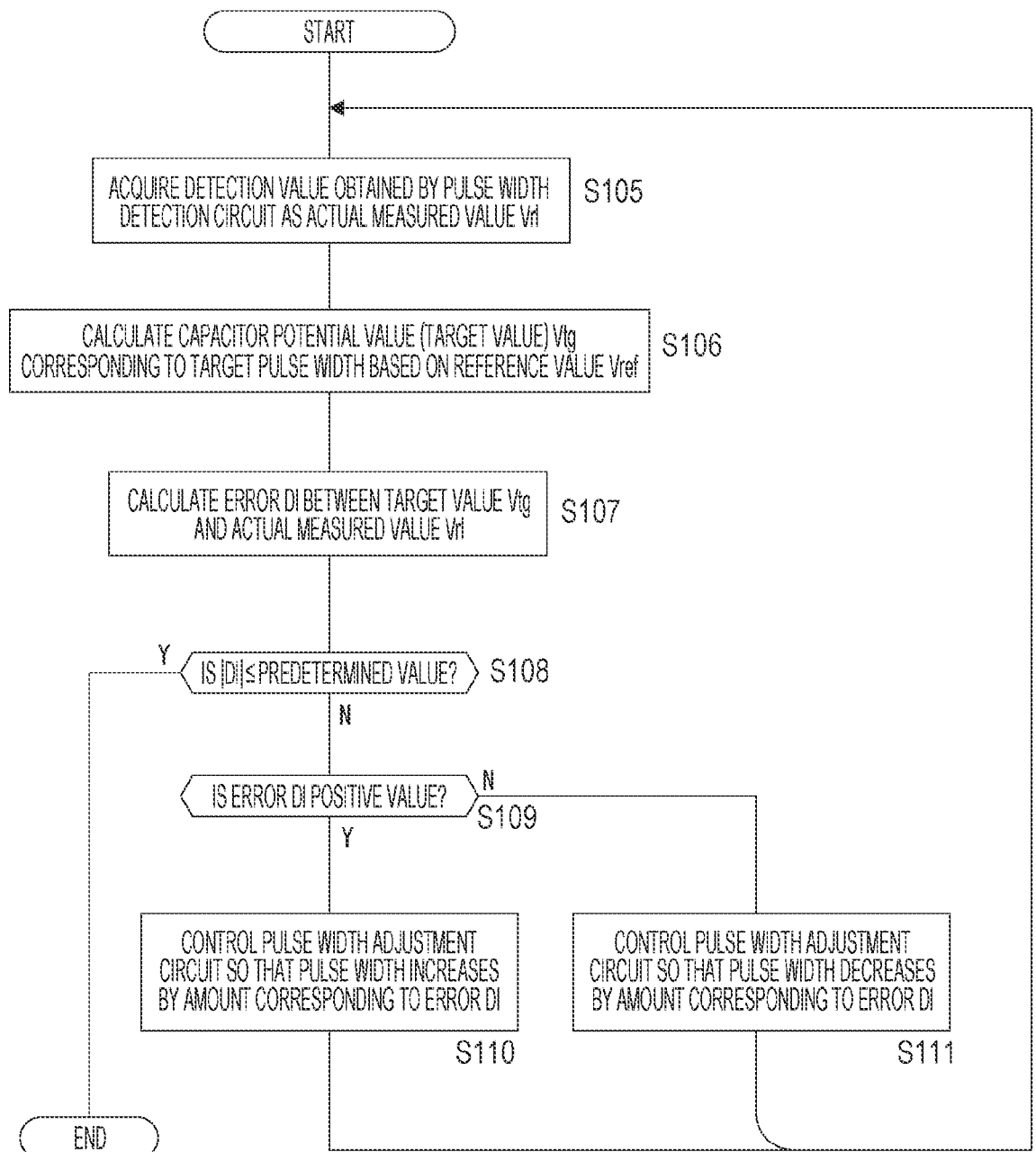
FIG. 8 is a flowchart illustrating an example of a specific processing procedure to be executed by the drive control unit to implement pulse width adjustment based on the reference value.

FIG. 8 illustrates an example of a specific processing procedure to be executed by the drive control unit 30 to implement pulse width adjustment based on the reference value Vref.

The processing illustrated in FIG. 8 is processing that can be executed during distance measurement. In this example, it is assumed that the processing illustrated in FIG. 8 is executed at a predetermined timing during distance measurement. That is, the pulse width of the drive signal Sd has been adjusted to the pulse width suitable at the time of distance measurement (e.g., 1 ns) shorter than the known pulse width to which it was adjusted at the time of acquisition of the reference value Vref.

First, in step S105, the drive control unit 30 acquires the detection value Dp obtained by the pulse width detection circuit 37 as the actual measured value Vrl.

In subsequent step S106, the drive control unit 30 calculates a capacitor potential value corresponding to the target pulse width, that is, the target value Vtg, on the basis of the reference value Vref. The target value Vtg is calculated, for example, by multiplying the reference value Vref by the value of the ratio of the target pulse width to the known pulse width used at the time of acquisition of the reference value Vref.

In step S107 subsequent to step S106, the drive control unit 30 calculates the error between the target value Vtg and the actual measured value Vrl. Specifically, "target value Vtg−actual measured value Vrl" is calculated as the error Dl.

In step S108 subsequent to step S107, the drive control unit 30 determines whether or not the absolute value of the error Dl is less than or equal to a predetermined value. If the absolute value of the error Dl is less than or equal to the predetermined value, a series of processing steps illustrated in FIG. 8 is finished. That is, if the error Dl occurring is negligible, pulse width adjustment based on the error Dl is not performed. Furthermore, if the absolute value of the error Dl becomes less than or equal to the predetermined value as a result of performing pulse width adjustment based on the error Dl through processing to be described below, the processing for pulse width adjustment illustrated in FIG. 8 is finished.

On the other hand, if it is determined that the absolute value of the error Dl is not less than or equal to the predetermined value, the drive control unit 30 proceeds to step S109 and determines whether or not the error Dl is a positive value (that is, whether or not the pulse width is shorter than the target).

If the error Dl is a positive value, the drive control unit 30 proceeds to step S110 and controls the pulse width adjusting circuit 32 so that the pulse width increases by an amount corresponding to the error Dl. Specifically, the delay amount in the variable delay circuit 32a is controlled by the adjustment signal Ad to decrease the delay amount by the amount corresponding to the error Dl.

On the other hand, if the error Dl is not a positive value, the drive control unit 30 proceeds to step S111 and controls the pulse width adjusting circuit 32 so that the pulse width decreases by an amount corresponding to the error Dl. That is, the delay amount in the variable delay circuit 32a is controlled by the adjustment signal Ad to increase the delay amount by the amount corresponding to the error Dl.

In response to the execution of the processing in step S110 or S111, the drive control unit 30 returns to step S105. Thus, the adjustment of the pulse width can be repeated until the absolute value of the error Dl becomes less than or equal to the predetermined value.

<5. Modification Related to Reference Value Acquisition>

The above has described the example in which the pulse width of the drive signal Sd is adjusted to the known pulse width corresponding to the reference period to acquire the reference value Vref, but how to acquire the reference value Vref is not limited to this method.

Figure 9:
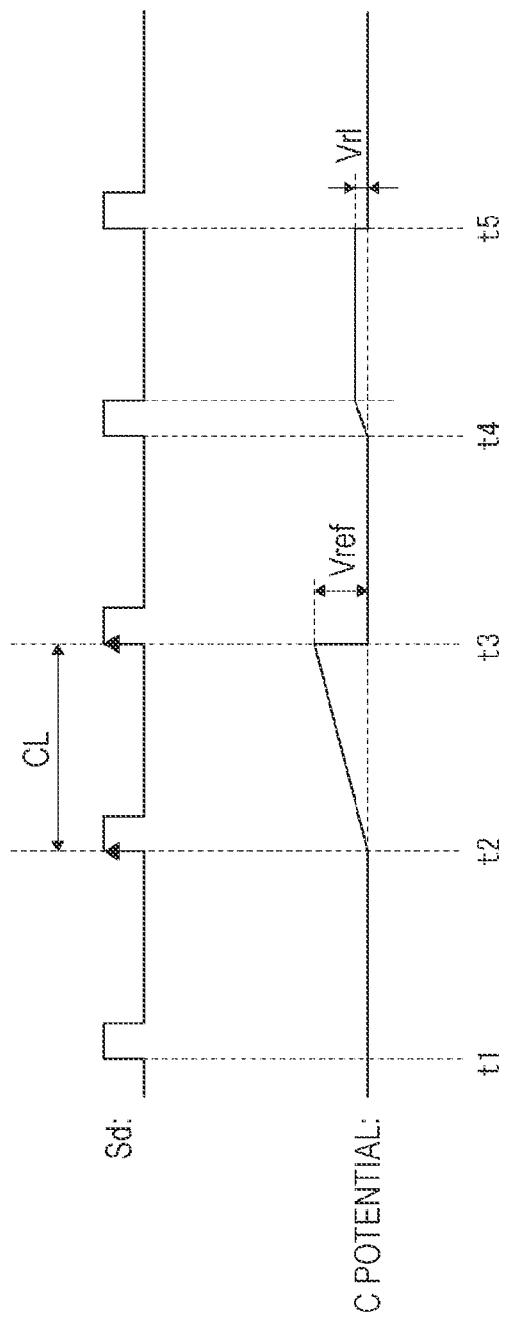
FIG. 9 is an explanatory diagram of a modification related to reference value acquisition.

For example, as illustrated in FIG. 9, a method of acquiring the reference value Vref using the period CL corresponding to one cycle of the drive signal Sd as the reference period can be adopted.

Specifically, in this case, the potential of the capacitor C when the capacitor C is charged over the period CL corresponding to one cycle of the drive signal Sd by the pulse width adjusting circuit 32 is detected as the reference value Vref. For example, as illustrated in the figure, the capacitor C is charged between an arbitrary rise timing (in the figure, a time t2) of rise timings of the drive signal Sd (in the figure, a time t1 to a time t5) and the next rise timing (a time t3), and the potential of the charged capacitor C is set as the reference value Vref.

This method of acquiring the reference value Vref eliminates the need to adjust the pulse width of the drive signal Sd to a large pulse width corresponding to the reference period. That is, it allows the acquisition of the reference value Vref with the pulse width of the drive signal Sd maintained at a normal pulse width for distance measurement, and allows the acquisition of the reference value Vref even during distance measurement.

In this example, the reference value Vref and the actual measured value Vrl are acquired during distance measurement, and the pulse width is adjusted during distance measurement on the basis of the reference value Vref and the actual measured value Vrl.

The example of FIG. 9 illustrates an example in which the actual measured value Vrl is acquired after the reference value Vref is acquired. Specifically, the charging of the capacitor C for acquiring the actual measured value Vrl is started at the rise timing (the time t4) of the drive signal Sd immediately after the timing (the time t3) at which the charging of the capacitor C for acquiring the reference value Vref has been completed.

Here, the detection of the reference value Vref is performed by charging the capacitor C over the period between the rise timings of the drive signal Sd, whereas the detection of the actual measured value Vrl is performed by charging the capacitor C over the period between the rise timing and the fall timing of the drive signal Sd.

Figure 10:
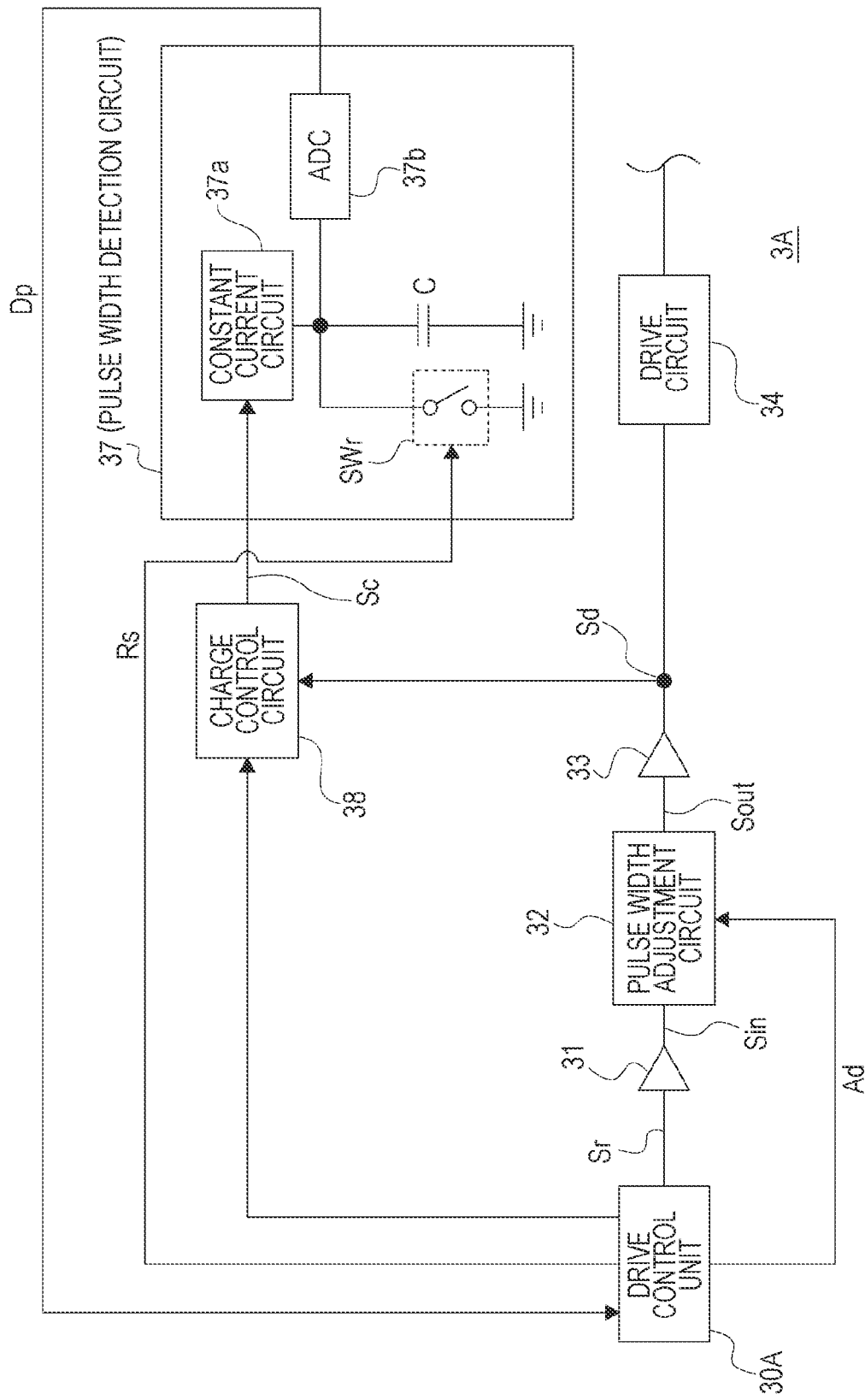
FIG. 10 is a diagram illustrating an internal configuration example of a drive unit for implementing a method as the modification illustrated in FIG. 9.

FIG. 10 is a diagram illustrating an internal configuration example of a drive unit 3A for implementing the method as the modification described with reference to FIG. 9.

Note that in the following description, the same reference numerals and the same step numbers are assigned to portions similar to the already-described portions to avoid duplicate explanation.

Differences from the drive unit 3 illustrated in FIG. 2 are that a drive control unit 30A is provided instead of the drive control unit 30, and that a charging control circuit 38 is added.

The charging control circuit 38 generates a control signal Sc for controlling current output operation by the constant current circuit 37a in the pulse width detection circuit 37, on the basis of the drive signal Sd. The charging control circuit 38 has a first mode and a second mode as modes of generating the control signal Sc. The first mode is a mode suitable at the time of acquisition of the reference value Vref, and is a mode of switching the control signal Sc ON/OFF with the rise timing of the drive signal Sd as a trigger. The second mode is a mode suitable at the time of acquisition of the actual measured value Vrl, and is a mode of switching the control signal Sc ON/OFF with each of the rise timing and the fall timing of the drive signal Sd as a trigger.

In this case, the constant current circuit 37a outputs a charging current for the capacitor C in periods during which the control signal Sc is ON, and stops outputting the charging current in periods during which the control signal Sc is OFF.

By performing mode switching control of the charging control circuit 38, the drive control unit 30A achieves the acquisition of the reference value Vref and the acquisition of the actual measured value Vrl during distance measurement, and performs calculation of the error Dl based on the reference value Vref and the actual measured value Vrl, and control of the pulse width adjusting circuit 32 based on the error Dl.

Figure 11:
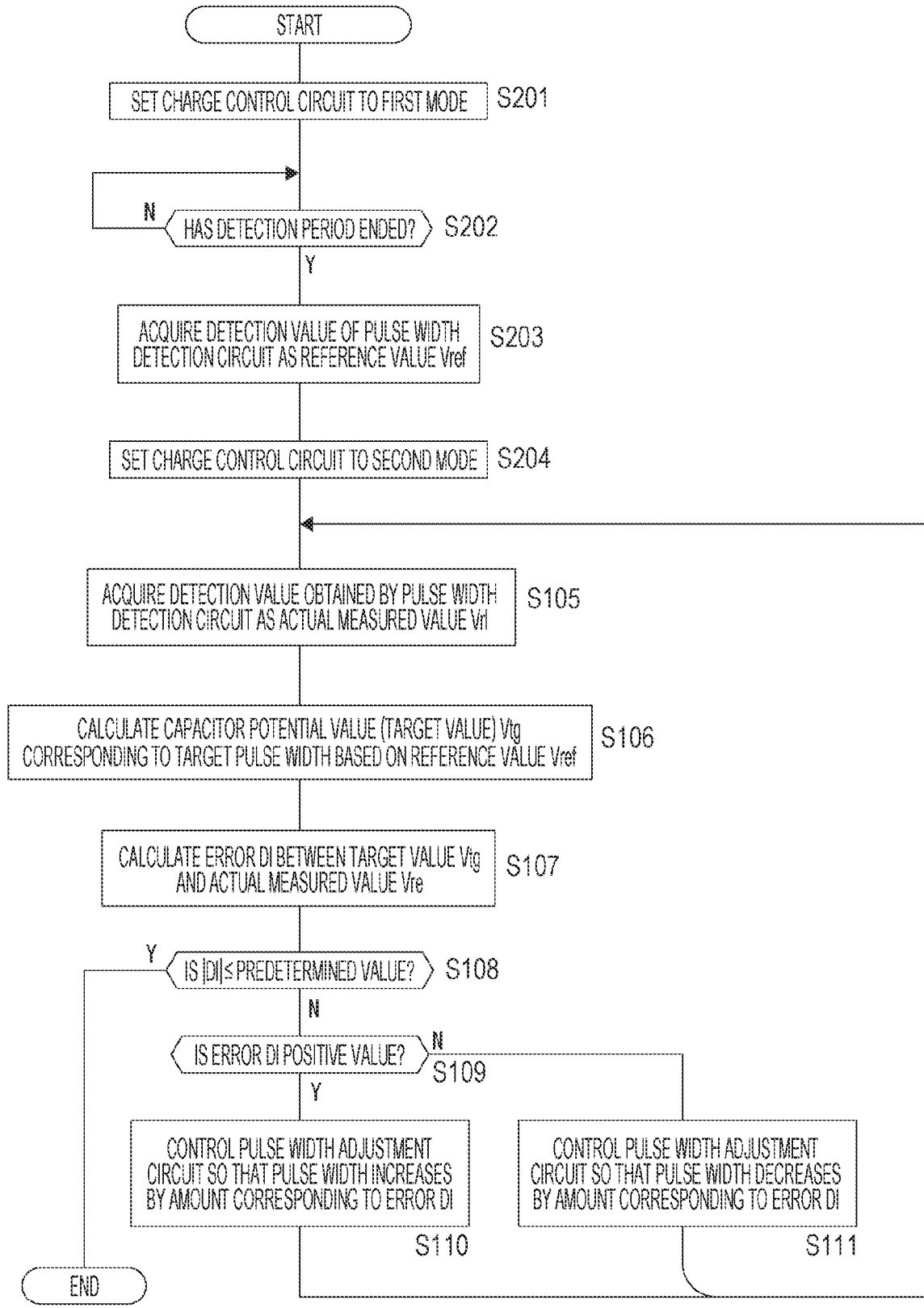
FIG. 11 is a flowchart illustrating an example of a processing procedure to be executed by a drive control unit in the modification.

FIG. 11 is a flowchart illustrating an example of a processing procedure executed by the drive control unit 30A in the modification.

First, in step S201, the drive control unit 30A performs processing to set the charging control circuit 38 to the first mode, and in subsequent step S202, performs processing to wait until the end of a detection period. The detection period here means the period CL in the drive signal Sd, and corresponds to the period between the time t2 and the time t3 in the example of FIG. 9. Note that the drive control unit 30A grasps the delay amount in the variable delay circuit 32a in the pulse width adjusting circuit 32, and thus can estimate the rise timing of the drive signal Sd on the basis of the rise timing of the reference period signal Sr. That is, the start timing and the end timing of the period CL can be estimated.

When it is determined in step S202 that the detection period has ended, the drive control unit 30A proceeds to step S203 and acquires the detection value Dp of the pulse width detection circuit 37 as the reference value Vref.

Then, in step S204 subsequent to step S203, the drive control unit 30A sets the charging control circuit 38 to the second mode, and advances the processing to step S105.

Note that processing in and after step S105 has already been described, and thus duplicate explanation thereof is avoided.

<6. Configuration Variations>
[6-1. Configuration Example of Connection Mode of Light-Emitting Elements]

An example of a mode of connection of the light-emitting elements 2a to the drive unit 3 will be described with reference to FIGS. 12 to 14.

Figure 12:
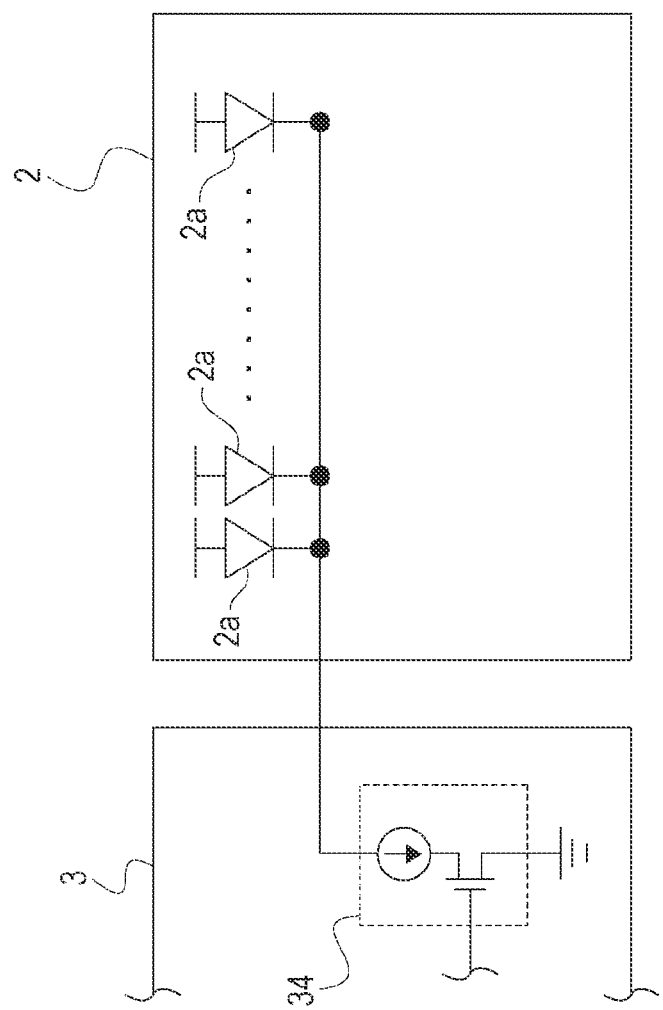
FIG. 12 is a diagram for explaining an example of a mode of connection of light-emitting elements to the drive unit.

FIG. 12 illustrates a configuration example in which the single drive circuit 34 drives the plurality of light-emitting elements 2a. FIG. 13 illustrates a configuration example in which the drive unit 3 includes a plurality of drive circuits 34, and each drive circuit 34 drives two or more of the light-emitting elements 2a, separately. Furthermore, FIG. 14 illustrates a configuration example in which the drive unit 3 includes a plurality of drive circuits 34, and each drive circuit 34 drives one of the light-emitting elements 2a, separately.

[6-2. About Signal to be Detected]

Figure 13:
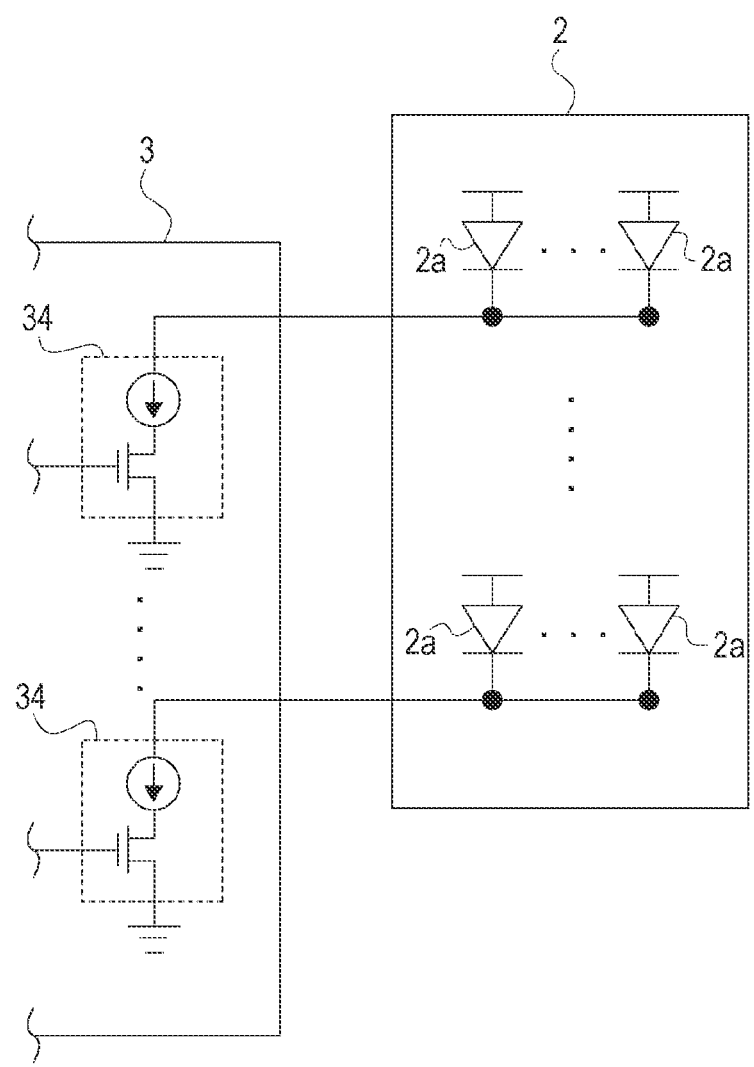
FIG. 13 is a diagram for explaining another example of a mode of connection of the light-emitting elements to the drive unit.
Figure 14:
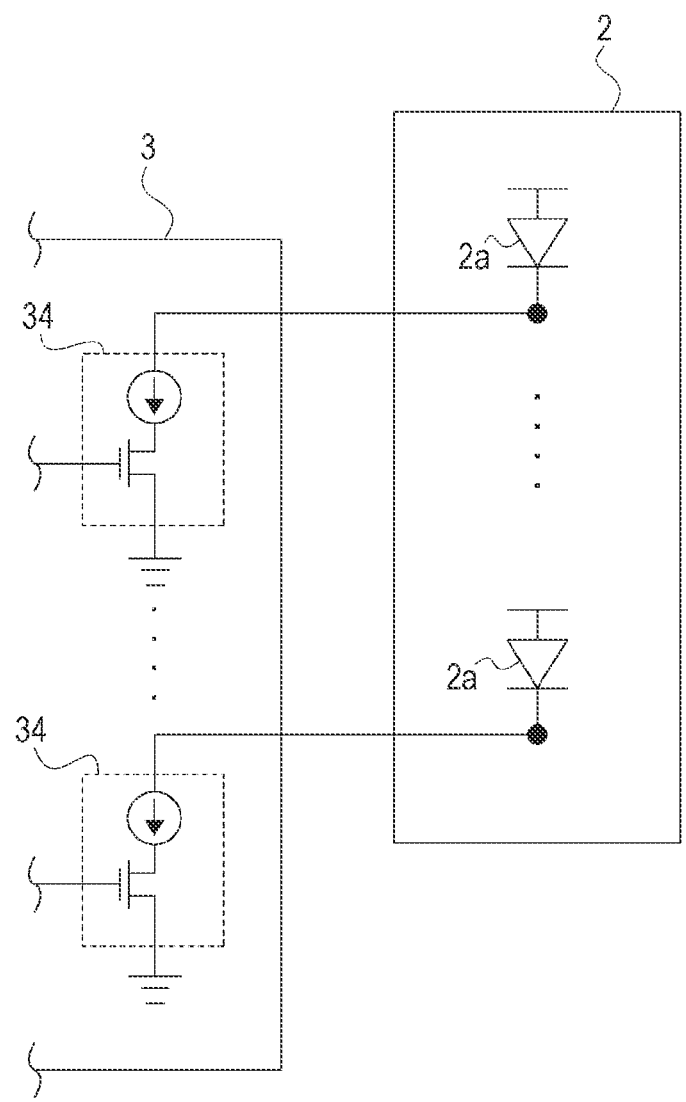
FIG. 14 is a diagram for explaining still another example of a mode of connection of the light-emitting elements to the drive unit.

Here, in the case of adopting a configuration in which the drive unit 3 includes a plurality of drive circuits 34 as illustrated in FIG. 13 or 14, in order to perform pulse width detection for pulse width adjustment on the drive signal Sd, the pulse width detection circuit 37 is provided for each drive circuit 34, which can lead to increases in the number of circuit components and the circuit scale, contributing to an increase in cost.

Figure 15:
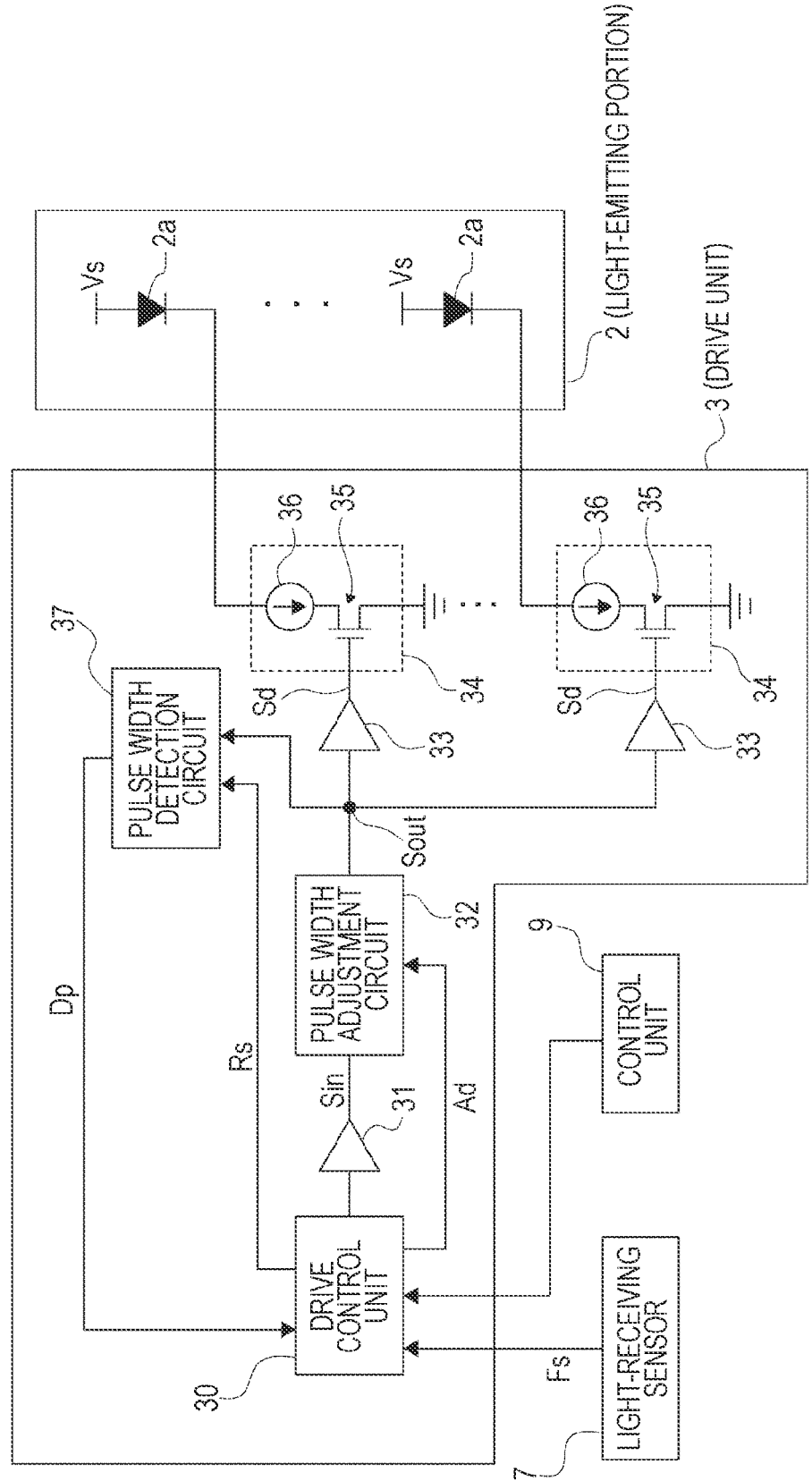
FIG. 15 is a diagram illustrating an internal configuration example of the drive unit according to a modification in a signal to be detected.

Therefore, as illustrated in FIG. 15, the output signal Sout, which is a pulse signal before branching off to each drive circuit 34, may be used as a signal to be detected by the pulse width detection circuit 37.

As illustrated in the figure, in the drive unit 3 in this case, a plurality of sets of the buffer 33 and the drive circuit 34 is provided, and the output signal Sout branches off to be input to each of the buffers 33 in the respective sets. Then, instead of the drive signal Sd, the output signal Sout is input to the pulse width detection circuit 37 in this case as a pulse-width detection target signal.

Adopting this configuration eliminates the need to provide the pulse width detection circuit 37 for each drive circuit 34, allowing a reduction in the number of circuit components, a reduction in circuit scale, and a reduction in cost.

Here, to properly perform pulse width adjustment, it is desirable to input a signal at the closest possible portion to the light-emitting elements 2a as a pulse width detection target signal because it can reduce the error between a detected pulse width and an actual light emission pulse width. In the case of adopting a configuration in which a pulse signal before branching off to each drive circuit 34 is used as a pulse width detection target signal as illustrated in FIG. 15, the error between a detected pulse width and an actual light emission pulse width can increase, leading to a reduction in the accuracy of pulse width adjustment.

Figure 16:
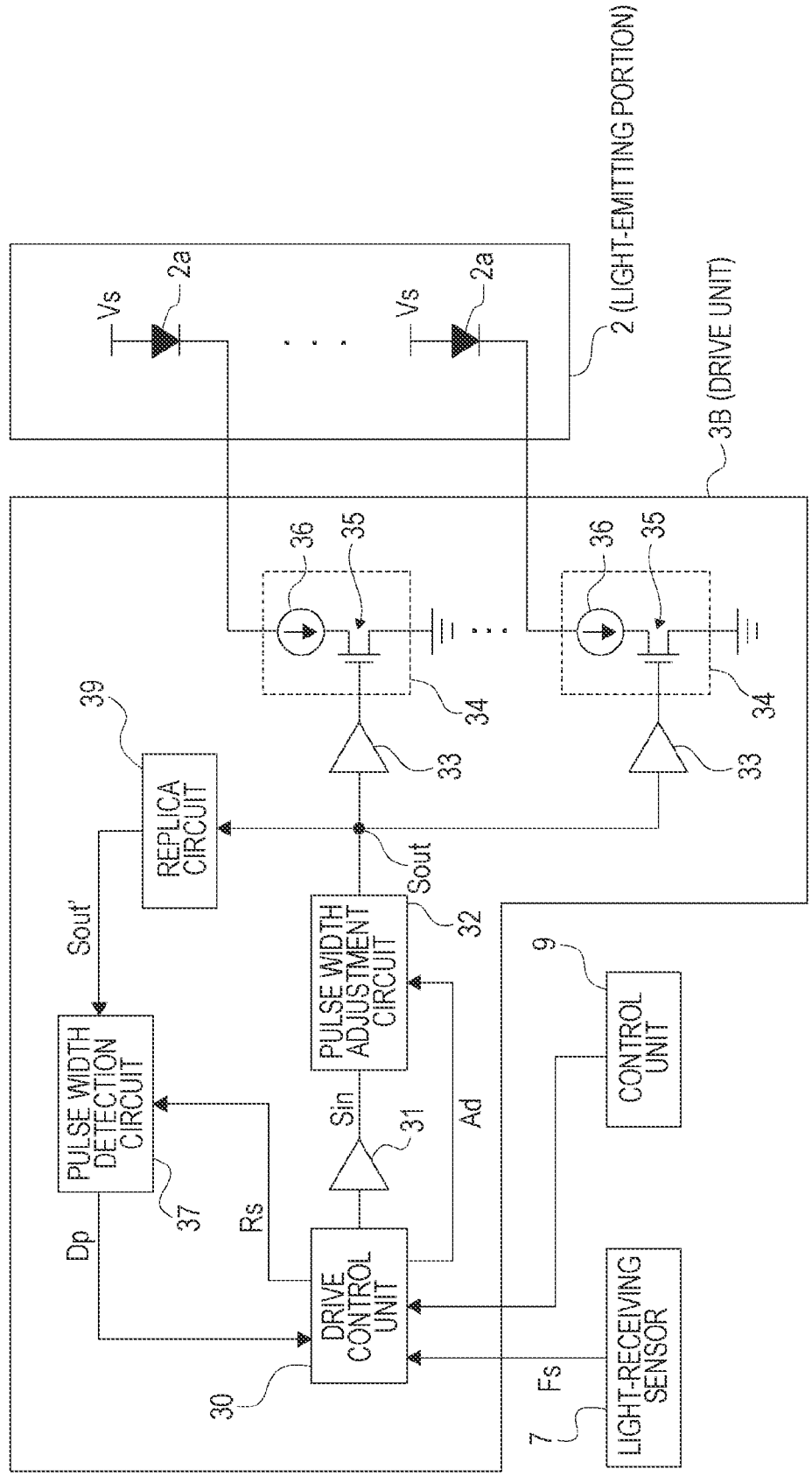
FIG. 16 is a diagram illustrating an internal configuration example of a drive unit according to a modification using a replica circuit.

Then, as in a drive unit 3B illustrated in FIG. 16, it is also possible to adopt a configuration in which a pulse signal before branching off is input to the pulse width detection circuit 37 via a replica circuit 39.

As illustrated in the figure, in the drive unit 3B, the output signal Sout is input to the replica circuit 39, and the output of the replica circuit 39 is input to the pulse width detection circuit 37 as an output signal Sout'.

Figure 17:
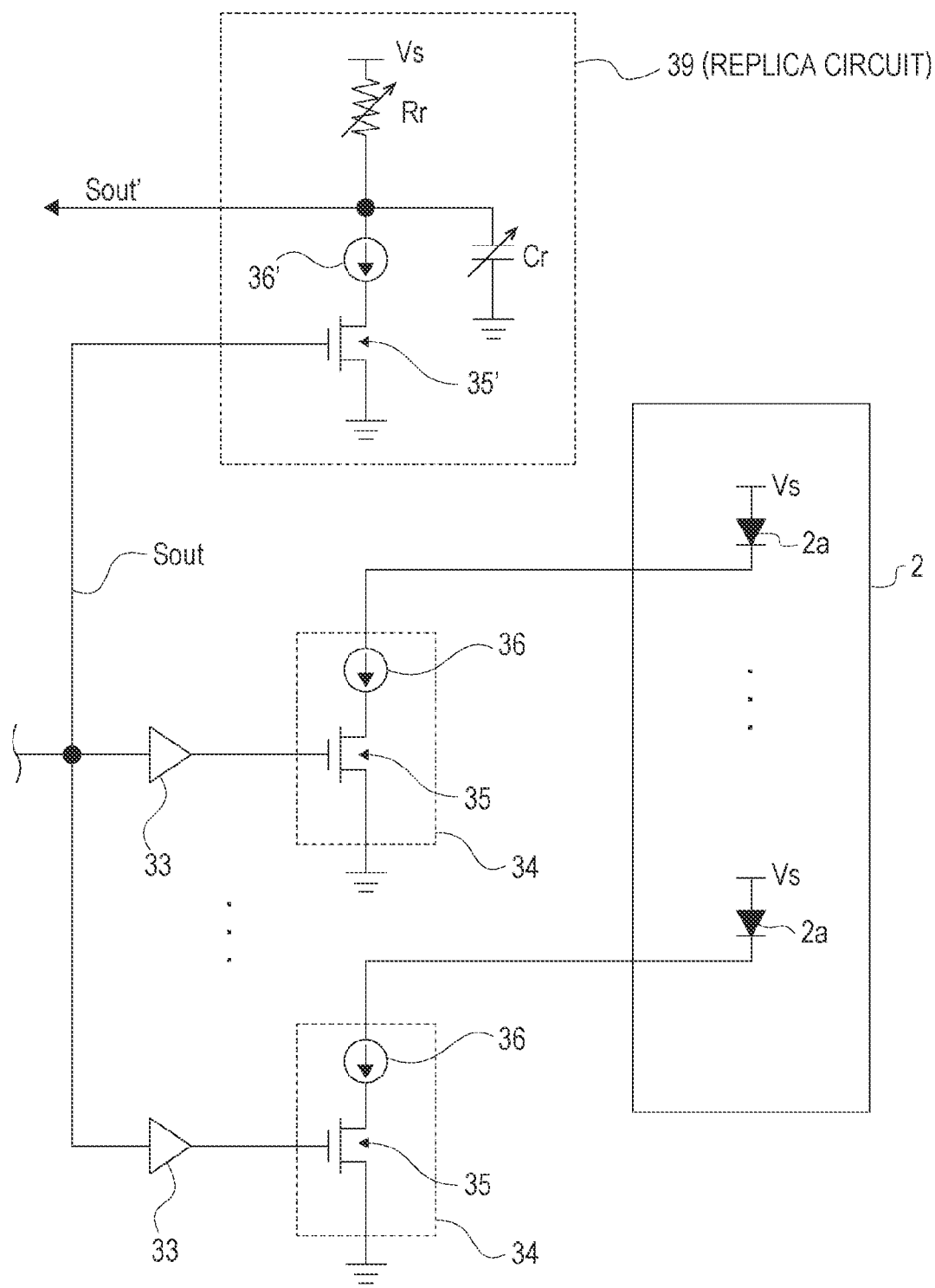
FIG. 17 is a diagram for explaining an internal configuration example of the replica circuit.

FIG. 17 is a diagram for explaining an internal configuration example of the replica circuit 39.

The replica circuit 39 is a circuit that simulates the characteristics of the drive circuits 34 and subsequent circuit portions. As illustrated in the figure, in the replica circuit 39 of this example, a resistor Rr simulating the resistance components of the light-emitting elements 2a, and a series-connected circuit of a drive element 35' and a current source 36' are inserted between the power supply voltage Vs and a ground. In addition, the replica circuit 39 is provided with a capacitor Cr connected in parallel to the series-connected circuit of the drive element 35' and the current source 36'. A connection point between the positive electrode-side terminal of the capacitor Cr, the current source 36', and the resistor Rr is an output point of the output signal Sout'.

In this replica circuit 39, the delay characteristics of the light-emitting elements 2a can be represented by the resistance value of the resistor Rr and the capacitance of the capacitor Cr.

Adopting the configuration illustrated in FIG. 17 allows pulse width detection based on the pulse signal to which a delay expected to occur in the drive circuits 34 and the subsequent circuit portions has been applied.

Thus, in a case where a configuration in which a pulse signal before branching off to the plurality of drive circuits 34 is used for pulse width detection (that is, a configuration in which the number of the pulse width detection circuits 37 is reduced) is adopted, the pulse width can be detected properly, and the pulse width adjustment accuracy can be improved.

[6-3. Other Configuration Examples]

In the above description, the configurations in which the pulse width adjusting circuit 32 is provided in the drive unit 3 have been illustrated, but the pulse width adjusting circuit 32 may be provided on the light-receiving sensor 7 side.

Figure 18:
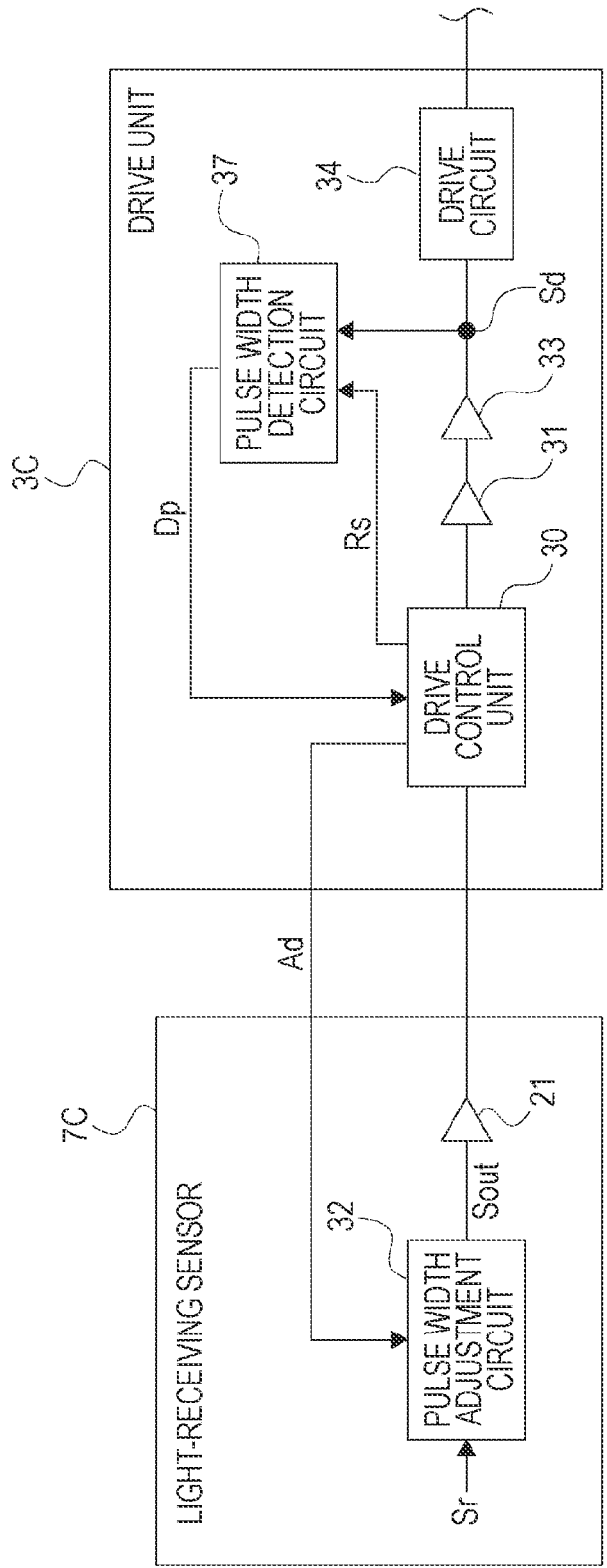
FIG. 18 is an explanatory diagram of a configuration example in which the pulse width adjusting circuit is provided on the light-receiving sensor side.

FIG. 18 illustrates an internal configuration example of a drive unit 3C in which the pulse width adjusting circuit 32 is omitted and a light-receiving sensor 7C including the pulse width adjusting circuit 32.

The drive control unit 30 included in the drive unit 3C outputs the adjustment signal Ad to the pulse width adjusting circuit 32 included in the light-receiving sensor 7C to perform pulse width adjustment control on the drive signal Sd.

The pulse width adjusting circuit 32 in this case receives the reference period signal Sr generated on the basis of a clock (not illustrated) included in the light-receiving sensor 7C, generates a pulse signal with a pulse width depending on the adjustment signal Ad, and outputs it as the output signal Sout.

The output signal Sout in this case is input to the drive control unit 30 of the drive unit 3C through a buffer 21 included in the light-receiving sensor 7C, and then provided as the drive signal Sd from the drive control unit 30 to the drive circuit 34 through the buffer 31 and the buffer 33.

A light-receiving sensor for distance measurement using a direct ToF method includes a high-precision clock. Thus, the provision of the pulse width adjusting circuit 32 in the light-receiving sensor 7C as described above eliminates the need to additionally provide a high-precision clock for pulse width adjustment on the drive unit 3C side.

Consequently, the number of circuit components can be reduced, and the cost can be reduced.

Note that although FIG. 18 illustrates the example in which the single drive circuit 34 is used, a plurality of drive circuits 34 may be provided also in this case as illustrated in FIGS. 13 to 15. Furthermore, in that case, a pulse signal before branching off to the plurality of drive circuits 34 (in the example of FIG. 18, a pulse signal between the buffer 31 and the buffer 33 or between the drive control unit 30 and the buffer 31) may be input to the pulse width detection circuit 37 instead of inputting the drive signal Sd, and further, a configuration to which the replica circuit 39 illustrated in FIG. 16 is applied may be adopted.

FIGS. 19A, 19B, 20, and 21 are explanatory diagrams of the chip structures of the light-emitting portion 2 and the drive unit 3.

FIGS. 19A and 19B are diagrams for explaining an example of terminal arrangement on a semiconductor chip as the light-emitting portion 2.

First, as a premise, in this example, the light-emitting portion 2 and the drive unit 3 are configured as separate semiconductor chips. Hereinafter, the semiconductor chip as the light-emitting portion 2 is referred to as a chip Ch2, and the semiconductor chip as the drive unit 3 is referred to as a chip Ch3.

As illustrated in FIG. 19A, the chip Ch2 can be mounted on the chip Ch3. In this example, the cathodes of the light-emitting elements 2a are connected to the drive circuit 34, and the anodes are common (the anode of each light-emitting element 2a is connected to the common power supply voltage Vs). FIGS. 19A and 19B illustrate an arrangement example of cathode terminals Tc and anode terminals Ta on the chip Ch2 suitable in the case where the anodes are common as described above. All the cathode terminals Tc are arranged in a central portion of the chip Ch2 in the in-plane direction, and arrangement regions of the anode terminals Ta are provided outside an arrangement region of the cathode terminals Tc.

As a specific arrangement example, as illustrated in FIG. 19B, an arrangement region of the cathode terminals Tc is provided in a central portion in the longitudinal direction of the chip Ch2, and arrangement regions of the anode terminals Ta are provided on both sides thereof.

In each of the arrangement regions of the anode terminals Ta and the cathode terminals Tc, the terminals are arranged two-dimensionally in the row direction and the column direction. The number of rows of the terminals in each arrangement region is uniformly M (M is a natural number of two or more). In FIG. 19B, the numbers of columns of the terminals in the column direction in the respective arrangement regions are represented by A, L, and B (A, L, and B are all natural numbers of two or more), individually, but the numbers of A, L, and B may be all the same or all different. Alternatively, only at least one of them may be different.

Note that as an arrangement example of electrode pads Pd included in the chip Ch3, FIG. 19A illustrates an example in which a plurality of electrode pads Pd is arranged at each of both chip ends.

Figure 20:
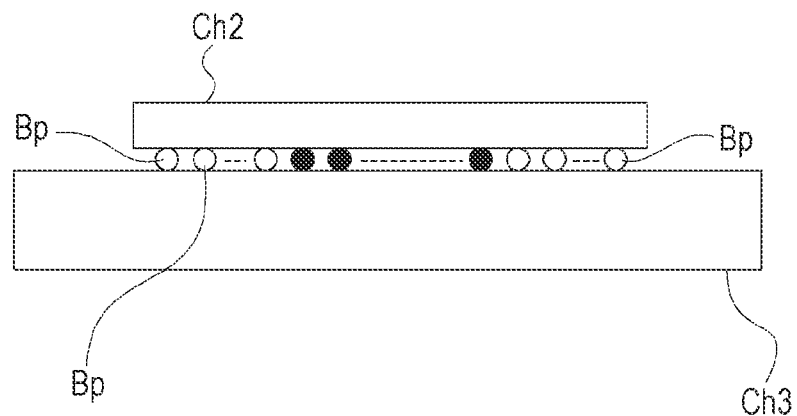
FIG. 20 is an explanatory diagram of an example of mounting of the semiconductor chip as the light-emitting portion.

Here, the chip Ch2 can be mounted on the chip Ch3 by flip-chip mounting using microbumps Bp (e.g., solder bumps) as illustrated in FIG. 20.

Figure 21:
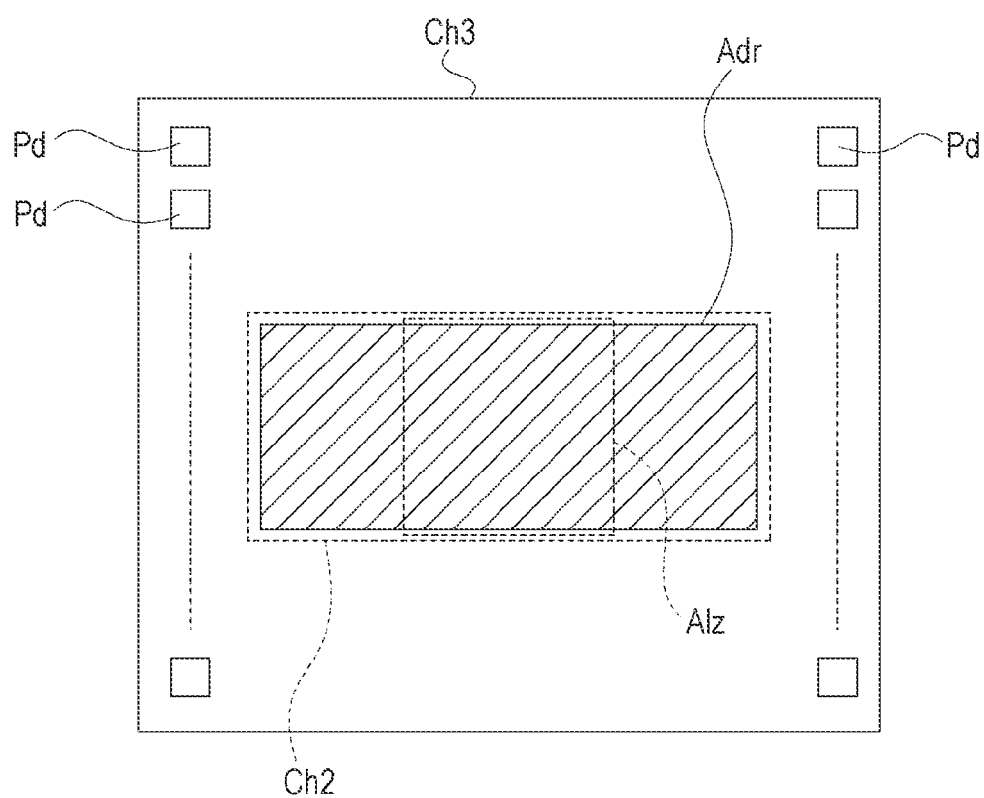
FIG. 21 is a diagram illustrating the positional relationship between a light-emitting element forming region and a drive circuit forming region.

FIG. 21 is a diagram illustrating the positional relationship between the forming region of the light-emitting elements 2a on the chip Ch2 and the forming region of the drive circuit 34 on the chip Ch3. Note that here, it is assumed that the drive unit 3 includes a plurality of drive circuits 34, and the light-emitting portion 2 also includes a plurality of light-emitting elements 2a as illustrated in FIG. 13 or 14 above.

In this example, in a state where the chip Ch2 is mounted on the chip Ch3, the position in the chip in-plane direction of a driver forming region Adr that is the forming region of the drive circuits 34 on the chip Ch3 overlaps the position in the chip in-plane direction of a light-emitting element forming region Alz that is the forming region of the light-emitting elements 2a on the chip Ch2. Specifically, at least part of the driver forming region Adr is located immediately below the light-emitting element forming region Alz, and the positions of the driver forming region Adr and the light-emitting element forming region Alz in the chip in-plane direction overlap each other.

This allows the drive circuits 34 to be disposed close to the light-emitting elements 2a, and allows the wiring length between the drive circuits 34 and the light-emitting elements 2a to be shortened. That is, the wiring resistance between the drive circuits 34 and the light-emitting elements 2a can be reduced, and the accuracy of the pulse width can be improved.

Note that, the above description has provided the example in which the pulse width adjusting method according to the present technology is applied to the light emission drive signal for distance measurement, but the pulse width adjusting method according to the present technology is not limited to the application to the light emission drive signal for distance measurement.

Furthermore, the pulse width may be detected by a time-to-digital converter (TDC).

<7. Summary of Embodiments>

As described above, a laser drive apparatus (the drive unit 3, 3A, 3B, or 3C) as an embodiment includes a drive circuit unit (the drive circuit 34) that drives light-emitting elements (the same 2a) as vertical-cavity surface-emitting lasers to emit light on the basis of a pulse signal, a pulse width detection unit (the pulse width detection circuit 37) that detects the pulse width of the pulse signal on the basis of the potential of a capacitor (the same C) when the capacitor (C) is charged on the basis of the pulse signal, and a control unit (the drive control unit 30 or 30A) that performs control so that the pulse width is adjusted on the basis of a detection result of the pulse width.

This eliminates the need to use a high-speed clock for pulse width detection even if the pulse width to be detected is small.

Consequently, the circuit configuration can be simplified, and the cost can be reduced.

Furthermore, in the laser drive apparatus as the embodiment, the pulse width detection unit starts and stops the charging of the capacitor according to the pulse signal.

This allows the pulse width to be represented by the potential of the capacitor.

Consequently, the pulse width can be properly detected by the measurement of the potential of the capacitor.

Furthermore, in the laser drive apparatus as the embodiment, the control unit causes the pulse width detection unit to measure the potential of the capacitor when the capacitor is charged over a predetermined reference period longer than a period corresponding to the pulse width to be adjusted as a reference potential (the reference value Vref), and causes the pulse width detection unit to measure the potential of the capacitor when the capacitor is charged on the basis of the pulse signal with the pulse width to be adjusted as an actual measured potential (the actual measured value Vrl), and performs pulse width adjustment control on the basis of the actual measured potential and the reference potential.

By using the reference potential corresponding to the reference period as described above, a target potential as a potential corresponding to a target pulse width can be estimated from the ratio between a pulse width corresponding to the reference period and the target pulse width. Then, the pulse width can be adjusted on the basis of the error between the estimated target potential and the actual measured potential.

Consequently, proper pulse width adjustment can be achieved.

Furthermore, in the laser drive apparatus as the embodiment, the control unit obtains, as a target potential (the target value Vtg), a potential when the capacitor is charged on the basis of the pulse signal with a target pulse width, on the basis of the ratio between the target pulse width and the pulse width corresponding to the reference period and the reference potential, and performs the pulse width adjustment control on the basis of the target potential and the actual measured potential.

For the pulse width adjustment control, it is conceivable that a target potential may be stored in advance as a common value in each device without measuring a reference potential as described above, and pulse width adjustment may be performed on the basis of the error between an actual measured potential and the target potential. However, it is conceivable that the relationship between the pulse width and the charging potential of the capacitor may vary between devices due to variations in the characteristics of used components etc. By adopting the method of obtaining the target potential on the basis of the reference potential as described above, such variations between devices can be absorbed.

Consequently, the pulse width adjustment accuracy can be improved.

Furthermore, in the laser drive apparatus as the embodiment, the control unit (the drive control unit 30A) causes the potential of the capacitor when the capacitor is charged over a period of one cycle of the pulse signal to be measured as the reference potential.

This eliminates the need to increase the pulse width to the pulse width for reference potential measurement to measure the reference potential.

Consequently, the reference potential can be measured while the light-emitting elements are normally driven. In other words, the reference potential can be measured without stopping normal light-emitting operation.

Furthermore, the laser drive apparatus as the embodiment includes a plurality of the drive circuit units, each of which drives a different one of the light-emitting elements to emit light, in which the pulse width detection unit detects the pulse width on the basis of the pulse signal before branching off to the plurality of drive circuit units (see FIGS. 15 and 16).

This eliminates the need to provide the pulse width adjusting unit for each drive circuit unit in a case where a configuration in which each of the plurality of drive circuit units drives a different one of the light-emitting elements to emit light is adopted.

Thus, the simplification of the circuit configuration allows a reduction in the number of circuit components, a reduction in circuit scale, and a reduction in cost.

Furthermore, in the laser drive apparatus as the embodiment, the pulse width detection unit detects the pulse width on the basis of the pulse signal before branching off input through a replica circuit simulating the characteristics of the drive circuit units and subsequent circuit portions.

This allows the detection of the pulse width based on the pulse signal to which a delay expected to occur in the drive circuit units and the subsequent circuit portions has been applied.

Thus, in a case where a configuration in which the pulse signal before branching off to the plurality of drive circuit units is used for pulse width detection is adopted, the pulse width can be detected properly, and the pulse width adjustment accuracy can be improved.

Furthermore, the laser drive apparatus as the embodiment further includes a pulse width adjusting unit (the pulse width adjusting circuit 32) that adjusts the pulse width on the basis of control by the control unit.

This allows the detection of the pulse width to the adjustment of the pulse width to be completed in the same chip.

Furthermore, a pulse width adjusting method as an embodiment is a pulse width adjusting method in a laser drive apparatus that drives light-emitting elements as vertical-cavity surface-emitting lasers to emit light on the basis of a pulse signal, the pulse width adjusting method including detecting the pulse width of the pulse signal on the basis of the potential of a capacitor when the capacitor is charged on the basis of the pulse signal, and adjusting the pulse width on the basis of a detection result of the pulse width.

The pulse width adjusting method as the embodiment like this can provide functions and effects similar to those of the above-described laser drive apparatus as the embodiment.

Furthermore, a sensing module as an embodiment includes a light-emitting portion in which a plurality of light-emitting elements as vertical-cavity surface-emitting lasers is arranged, a laser drive apparatus including a drive circuit unit that drives the light-emitting elements to emit light on the basis of a pulse signal, a pulse width detection unit that detects the pulse width of the pulse signal on the basis of the potential of a capacitor when the capacitor is charged on the basis of the pulse signal, and a control unit that performs control so that the pulse width is adjusted on the basis of a detection result of the pulse width, and a light-receiving sensor (the same 7 or 7C) that receives light emitted from the light-emitting portion and reflected by a subject.

The sensing module as the embodiment like this can provide functions and effects similar to those of the above-described laser drive apparatus as the embodiment.

Furthermore, in the sensing module as the embodiment, the light-receiving sensor is a sensor for distance measurement using a direct ToF method including SPAD elements as light-receiving elements that receive light reflected by the subject.

In direct ToF, the pulse width of a laser drive signal tends to be small.

Therefore, it is preferable to apply the pulse width adjusting method according to the embodiment.

Furthermore, in the sensing module as the embodiment, the light-receiving sensor (the same 7C) includes a pulse width adjusting unit (the pulse width adjusting circuit 32) that adjusts the pulse width on the basis of control of the control unit in the laser drive apparatus.

The light-receiving sensor for distance measurement using the direct ToF method includes a high-precision clock. Thus, the provision of the pulse width adjusting unit in the light-receiving sensor as described above eliminates the need to additionally provide a high-precision clock for pulse width adjustment on the laser drive apparatus side.

Consequently, the number of circuit components can be reduced, and the cost can be reduced.

Furthermore, in the sensing module as the embodiment, the sensing module includes a plurality of the drive circuit units, each of which drives a different one of the light-emitting elements to emit light, a first semiconductor chip (the chip Ch2) on which the plurality of light-emitting elements is formed is mounted on a second semiconductor chip (the chip Ch3) on which the plurality of drive circuit units is formed, and the positions in the chip in-plane direction of a forming region of the plurality of drive circuit units (the driver forming region Adr) and a forming region of the plurality of light-emitting elements (the light-emitting element forming region Alz) overlap each other.

This allows the drive circuit units to be disposed close to the light-emitting elements.

Consequently, the wiring resistance between the drive circuit units and the light-emitting elements can be reduced, and the accuracy of the pulse width can be improved.

Note that the effects described in the present description are merely examples and nonlimiting, and other effects may be included.

<8. The Present Technology>

Note that the present technology can also have the following configurations.

(1)
A laser drive apparatus including:
 a drive circuit unit that drives light-emitting elements as vertical-cavity surface-emitting lasers to emit light on the basis of a pulse signal;
 a pulse width detection unit that detects the pulse width of the pulse signal on the basis of the potential of a capacitor when the capacitor is charged on the basis of the pulse signal; and
 a control unit that performs control so that the pulse width is adjusted on the basis of a detection result of the pulse width.

(2)
The laser drive apparatus according to (1) above, in which the pulse width detection unit starts and stops charging of the capacitor according to the pulse signal.

(3)
The laser drive apparatus according to (1) or (2) above, in which
 the control unit causes the pulse width detection unit to measure, as a reference potential, the potential of the capacitor when the capacitor is charged over a predetermined reference period longer than a period corresponding to the pulse width to be adjusted, and
 the control unit causes the pulse width detection unit to measure, as an actual measured potential, the potential of the capacitor when the capacitor is charged on the basis of the pulse signal with the pulse width to be adjusted, and performs adjustment control of the pulse width on the basis of the actual measured potential and the reference potential.

(4)
The laser drive apparatus according to (3) above, in which the control unit obtains, as a target potential, a potential when the capacitor is charged on the basis of the pulse signal with a target pulse width, on the basis of a ratio between the target pulse width and a pulse width corresponding to the reference period, and the reference potential, and performs adjustment control of the pulse width on the basis of the target potential and the actual measured potential.

(5)
The laser drive apparatus according to (3) or (4) above, in which
 the control unit causes the potential of the capacitor when the capacitor is charged over a period of one cycle of the pulse signal to be measured as the reference potential.

(6)
The laser drive apparatus according to any one of (1) to (5) above, further including:
 a plurality of the drive circuit units, each of which drives a different one of the light-emitting elements to emit light, in which
 the pulse width detection unit detects the pulse width on the basis of the pulse signal before branching off to the plurality of drive circuit units.

(7)
The laser drive apparatus according to (6) above, in which the pulse width detection unit detects the pulse width on the basis of the pulse signal before branching off input through a replica circuit simulating characteristics of the drive circuit units and subsequent circuit portions.

(8)
The laser drive apparatus according to any one of (1) to (7) above, further including:
 a pulse width adjusting unit that adjusts the pulse width on the basis of control by the control unit.

(9)
A pulse width adjusting method in a laser drive apparatus that drives light-emitting elements as vertical-cavity surface-emitting lasers to emit light on the basis of a pulse signal, the method including:
 detecting the pulse width of the pulse signal on the basis of the potential of a capacitor when the capacitor is charged on the basis of the pulse signal, and adjusting the pulse width on the basis of a detection result of the pulse width.

(10)
A sensing module including:
 a light-emitting portion in which a plurality of light-emitting elements as vertical-cavity surface-emitting lasers is arranged;
 a laser drive apparatus including a drive circuit unit that drives the light-emitting elements to emit light on the basis of a pulse signal, a pulse width detection unit that detects the pulse width of the pulse signal on the basis of the potential of a capacitor when the capacitor is charged on the basis of the pulse signal, and a control unit that performs control so that the pulse width is adjusted on the basis of a detection result of the pulse width; and
 a light-receiving sensor that receives light emitted from the light-emitting portion and reflected by a subject.

(11)
The sensing module according to (10) above, in which the light-receiving sensor is a sensor for distance measurement using a direct ToF method including SPAD elements as light-receiving elements that receive light reflected by the subject.

(12)

The sensing module according to (11) above, in which the light-receiving sensor includes a pulse width adjusting unit that adjusts the pulse width on the basis of control of the control unit in the laser drive apparatus.

(13)

The sensing module according to any one of (10) to (12) above, further including:
a plurality of the drive circuit units, each of which drives a different one of the light-emitting elements to emit light, in which
a first semiconductor chip on which the plurality of light-emitting elements is formed is mounted on a second semiconductor chip on which the plurality of drive circuit units is formed, and
the positions of a forming region of the plurality of drive circuit units and a forming region of the plurality of light-emitting elements in a chip in-plane direction overlap each other.

REFERENCE SIGNS LIST

1 Distance-measuring apparatus
2 Light-emitting portion
2a Light-emitting element
3, 3A, 3B, 3C Drive unit
4, 4A Power circuit
7, 7C Light-receiving sensor
30, 30A Drive control unit
32 Pulse width adjusting circuit
32a Variable delay circuit
32b AND gate circuit
34 Drive circuit
35 Drive element
36 Current source
37 Pulse width detection circuit
37a Constant current circuit
37b ADC
C Capacitor
SWr Reset switch
38 Charging control circuit
39 Replica circuit
Sd Drive signal
Vs Power supply voltage
Sr Reference period signal
Ad Adjustment signal
Ta Anode terminal
Tc Cathode terminal
Ch2, Ch3 Chip
Adr Driver forming region
Alz Light-emitting element forming region

The invention claimed is:

1. A laser drive apparatus, comprising:
circuitry electrically coupled to a capacitor and one or more light-emitting elements, wherein the circuitry is configured to:
drive, the one or more light-emitting elements to emit light, based on a first pulse signal;
detect a first pulse width of the first pulse signal based on a potential of the capacitor, wherein the capacitor is chargeable based on the first pulse signal; and
generate a second pulse signal based on the detected first pulse width, wherein the second pulse signal has a second pulse width.

2. The laser drive apparatus according to claim 1, wherein the circuitry is further configured to control a charging operation of the capacitor based on the first pulse signal.

3. The laser drive apparatus according to claim 1, wherein the circuitry is further configured to:
measure a charging interval of the capacitor;
measure a reference potential of the capacitor in a case where the charging interval of the capacitor is greater than a reference period, wherein the reference period is longer than a first period corresponding to the first pulse width of the first pulse signal;
measure an actual potential of the capacitor in a case where the charging interval of the capacitor is equal to the first period; and
adjust the first pulse width of the first pulse signal, based on the actual potential and the reference potential.

4. The laser drive apparatus according to claim 3, wherein for the adjustment of the first pulse width, the circuitry is further configured to:
estimate a target potential for the capacitor based on the reference potential and a ratio between a target pulse width for the first pulse signal and a reference pulse width corresponding to the reference period; and
adjust the first pulse width based on the target potential and the actual potential.

5. The laser drive apparatus according to claim 3, wherein the reference period includes a period of one cycle of the first pulse signal.

6. The laser drive apparatus according to claim 1, wherein the circuitry comprises a pulse width detection circuit and one or more drive circuits,
each drive circuit of the one or more drive circuits is configured to drive a corresponding light-emitting element of the one or more light-emitting elements,
the first pulse signal branches off to the one or more drive circuits, and
the pulse width detection circuit is configured to detect the first pulse width before the first pulse signal branches off to the one or more drive circuits.

7. The laser drive apparatus according to claim 6, wherein the circuitry further comprises a replica circuit configured to generate an output signal based on the first pulse signal,
the first pulse signal branches off to the replica circuit from the pulse width detection circuit,
the replica circuit simulates characteristics of the one or more drive circuits, and
the pulse width detection circuit is further configured to:
receive the output signal from the replica circuit; and
detect the first pulse width based on the output signal.

8. The laser drive apparatus according to claim 1, wherein for the generation of the second pulse signal, the circuitry is further configured to adjust the first pulse width to a value equal to the second pulse width.

9. A pulse width adjusting method, the comprising:
in a laser drive apparatus:
obtaining a measure of a potential of a capacitor, wherein the capacitor is electrically coupled to the laser drive apparatus;
detecting a first pulse width of a first pulse signal based on the measure of the potential of the capacitor, wherein the capacitor is chargeable based on the first pulse signal; and
generating a second pulse signal based on the detected first pulse width, wherein the second pulse signal has a second pulse width.

10. A sensing module, comprising:
a light-emitting portion comprising one or more light-emitting elements;

a laser drive apparatus including circuitry electrically coupled to a capacitor and the one or more light-emitting elements, wherein the circuitry is configured to:
- drive, the one or more light-emitting elements to emit light, based on a first pulse signal;
- detect a first pulse width of the first pulse signal based on a potential of the capacitor, wherein the capacitor is chargeable based on the first pulse signal; and
- generate a second pulse signal based on the detected first pulse width, wherein the second pulse signal has a second pulse width; and a light-receiving sensor configured to receive light reflected by a subject.

11. The sensing module according to claim 10, wherein
the light-receiving sensor is a direct time of flight-based sensor for distance measurement,
the light-receiving sensor includes one or more single-photon avalanche diodes (SPADs) as light-receiving elements, and
each SPAD of the one or more SPADs is configured to receive at least a portion of the light reflected by the subject.

12. The sensing module according to claim 11, wherein for the generation of the second pulse signal, the circuitry is further configured to adjust the first pulse width to a value equal to the second pulse width.

13. The sensing module according to claim 10, wherein the circuitry further comprises one or more drive circuits, each drive circuit of the one or more drive circuits is configured to drive a corresponding light-emitting element of the one or more light-emitting elements, and the sensing module further comprises:
- a first semiconductor chip mountable on a second semiconductor chip, wherein
  - the first semiconductor chip comprises the one or more light-emitting elements,
  - the second semiconductor chip comprises the one or more drive circuits, and
  - a first position of a first drive circuit of the one or more drive circuits in a first forming region and a second position of a first light-emitting element of the one or more light-emitting elements in a second forming region overlap in a chip in-plane direction.

* * * * *